(12) United States Patent
Wakabayashi

(10) Patent No.: US 11,131,543 B2
(45) Date of Patent: Sep. 28, 2021

(54) THREE-DIMENSIONAL MEASURING APPARATUS AND ROBOT SYSTEM

(71) Applicant: Seiko Epson Corporation, Tokyo (JP)

(72) Inventor: Shuichi Wakabayashi, Okaya (JP)

(73) Assignee: Seiko Epson Corporation

(*) Notice: Subject to any disclaimer, the term of this patent is extended or adjusted under 35 U.S.C. 154(b) by 1 day.

(21) Appl. No.: 16/831,918

(22) Filed: Mar. 27, 2020

(65) Prior Publication Data

US 2020/0309516 A1 Oct. 1, 2020

(30) Foreign Application Priority Data

Mar. 28, 2019 (JP) .............................. JP2019-064851

(51) Int. Cl.
*G01B 11/25* (2006.01)
*B25J 19/02* (2006.01)

(52) U.S. Cl.
CPC ......... *G01B 11/2518* (2013.01); *B25J 19/022* (2013.01)

(58) Field of Classification Search
CPC .. G01B 11/2518; G01B 11/254; B25J 19/022; B25J 9/401; B25J 9/1697; G05B 19/401
USPC ......................................... 356/601–613, 625
See application file for complete search history.

(56) References Cited

U.S. PATENT DOCUMENTS

| | | | | |
|---|---|---|---|---|
| 4,731,853 A * | 3/1988 | Hata | ................... | G06K 9/00201 348/42 |
| 5,381,235 A * | 1/1995 | Inoue | ................... | G01B 11/024 356/606 |
| 5,416,591 A * | 5/1995 | Yoshimura | ......... | G01B 11/2518 250/332 |
| 7,560,680 B2 * | 7/2009 | Sato | ..................... | G01B 11/024 250/208.1 |
| 9,146,096 B2 * | 9/2015 | Takahashi | ............... | G01B 11/24 |
| 2002/0122185 A1 * | 9/2002 | Ono | ........................ | G01B 11/25 356/601 |
| 2008/0118203 A1 * | 5/2008 | Tanaka | ................... | G02B 5/005 385/31 |
| 2009/0195644 A1 * | 8/2009 | Wakabayashi | ....... | G02B 26/101 348/51 |
| 2013/0321891 A1 * | 12/2013 | Ishida | ................ | G02B 27/0172 359/212.1 |

(Continued)

FOREIGN PATENT DOCUMENTS

JP 2018-190201 A 11/2018

*Primary Examiner* — Isiaka O Akanbi
(74) *Attorney, Agent, or Firm* — Harness, Dickey & Pierce, P.L.C.

(57) ABSTRACT

There is provided a three-dimensional measuring apparatus that performs three-dimensional measurement of an object using laser light, the apparatus including: a laser light source that emits the laser light; a line generating lens that widens and emits the laser light into line laser light having a first luminance distribution having a higher luminance at an edge portion than a luminance at a center portion in an extending direction; a mirror that swings around a swing axis, reflects the line laser light, and projects pattern light onto a projection surface including the object; an imaging portion that captures an image of the projection surface on which the pattern light is projected and acquires a pattern image; and a measuring portion that obtains a three-dimensional shape of the object based on the pattern image.

8 Claims, 17 Drawing Sheets

(56) References Cited

U.S. PATENT DOCUMENTS

| | | | |
|---|---|---|---|
| 2014/0368835 A1* | 12/2014 | Tabata | G01B 11/245 356/612 |
| 2016/0252742 A1* | 9/2016 | Wakabayashi | G02B 27/0103 345/8 |
| 2018/0203249 A1* | 7/2018 | Filhaber | H04N 13/254 |
| 2019/0094017 A1* | 3/2019 | Wakabayashi | B25J 9/1697 |

* cited by examiner

THREE-DIMENSIONAL MEASURING APPARATUS AND ROBOT SYSTEM

The present application is based on, and claims priority from JP Application Serial Number 2019-064851, filed Mar. 28, 2019, the disclosure of which is hereby incorporated by reference herein in its entirety.

BACKGROUND

1. Technical Field

The present disclosure relates to a three-dimensional measuring apparatus and a robot system.

2. Related Art

When a robot performs work, it is necessary to measure the shape of an object, such as a workpiece. Therefore, a robot provided with a three-dimensional measuring apparatus has been proposed.

As one of the measurement principles of a three-dimensional measuring apparatus, a phase shift method in which a pattern for three-dimensional measurement is projected toward an object, an image of the object on which the pattern is projected is captured, and a three-dimensional shape of the object is measured based on the obtained image. In order to accurately measure the three-dimensional shape in a phase shift method, it is required that an image of a pattern with a uniform luminance is captured over the entire surface of the acquired image, but it is known that the luminance decreases at a peripheral portion of the captured image due to peripheral light attenuation characteristics of a lens of an imaging portion.

Here, as described in JP-A-2018-190201, an image processing apparatus that corrects a luminance of a projection pattern based on a first captured image previously captured, and corrects a second captured image based on a projection signal when the projection pattern is generated, has been proposed.

However, in the image processing apparatus described in JP-A-2018-190201, processing for analyzing image quality characteristics and generating the projection pattern based on the analysis is required, but there is a problem that the processing require time.

SUMMARY

A three-dimensional measuring apparatus according to an aspect of the present disclosure performs three-dimensional measurement of an object using laser light, and the three-dimensional measuring apparatus includes: a laser light source that emits the laser light; a line generating lens that widens and emits the laser light into line laser light having a first luminance distribution having a higher luminance at an edge portion than a luminance at a center portion in an extending direction; a mirror that swings around a swing axis, reflects the line laser light, and projects pattern light onto a projection surface including the object; an imaging portion that captures an image of the projection surface on which the pattern light is projected and acquires a pattern image; and a measuring portion that obtains a three-dimensional shape of the object based on the pattern image.

DESCRIPTION OF EXEMPLARY EMBODIMENTS

Hereinafter, a three-dimensional measuring apparatus and a robot system according to the present disclosure will be described in detail based on embodiments illustrated in the attached drawings.

1. First Embodiment 1.1. Robot System

First, a first embodiment will be described.

Figure 1:
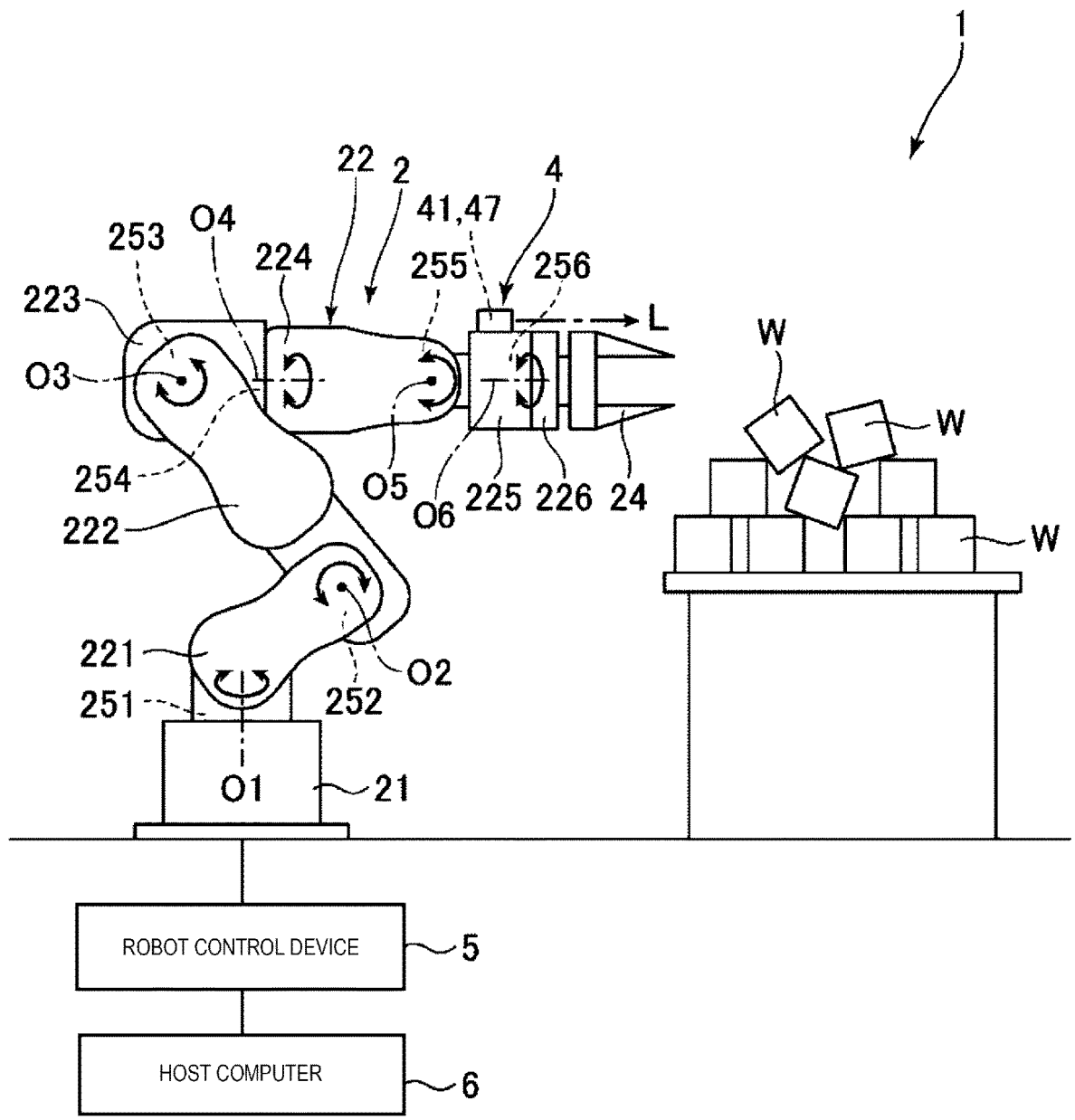
FIG. 1 is a view illustrating an overall configuration of a robot system according to a first embodiment.
Figure 2:
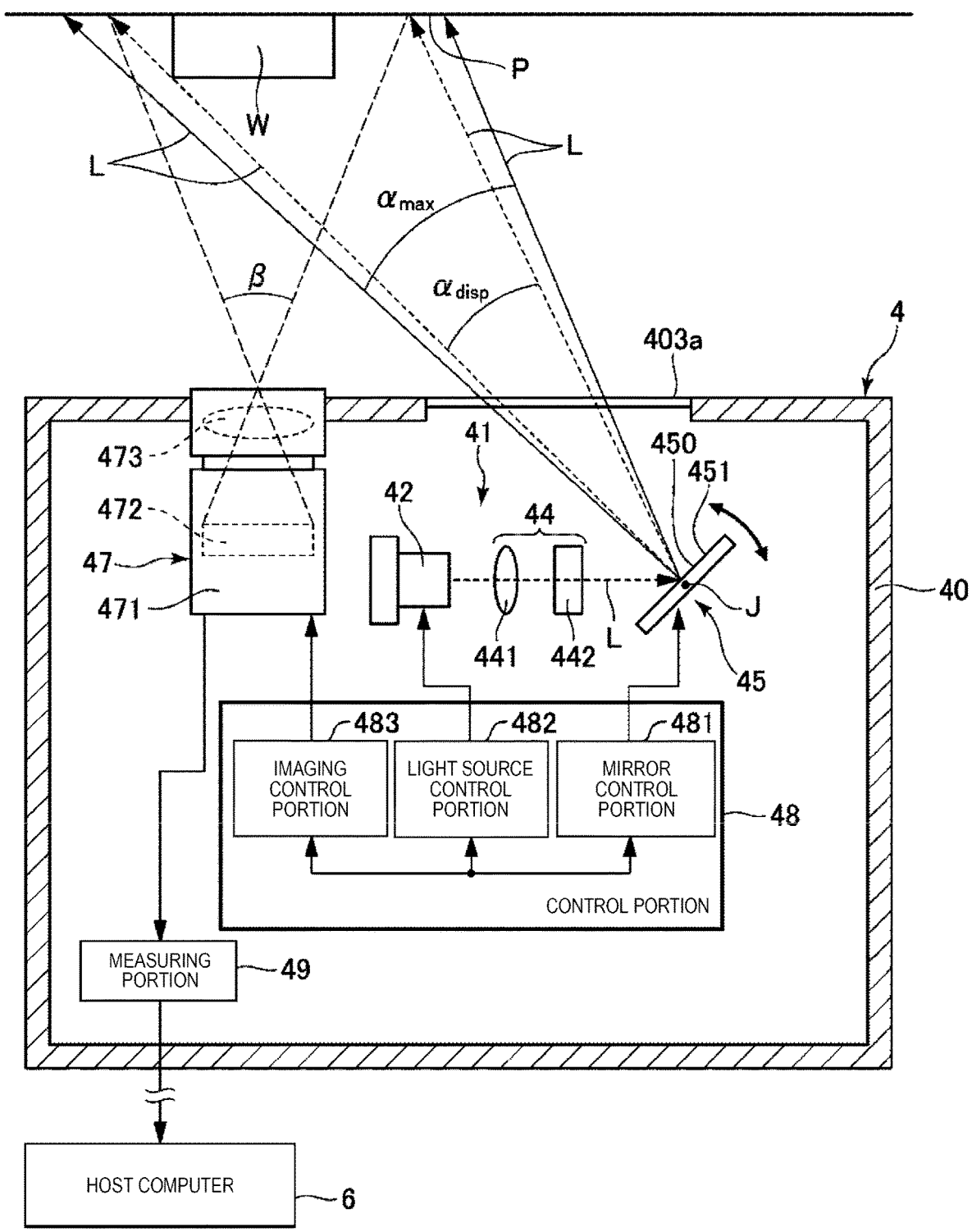
FIG. 2 is a view illustrating an overall configuration of a three-dimensional measuring apparatus provided in the robot system illustrated in FIG. 1.
Figure 3:
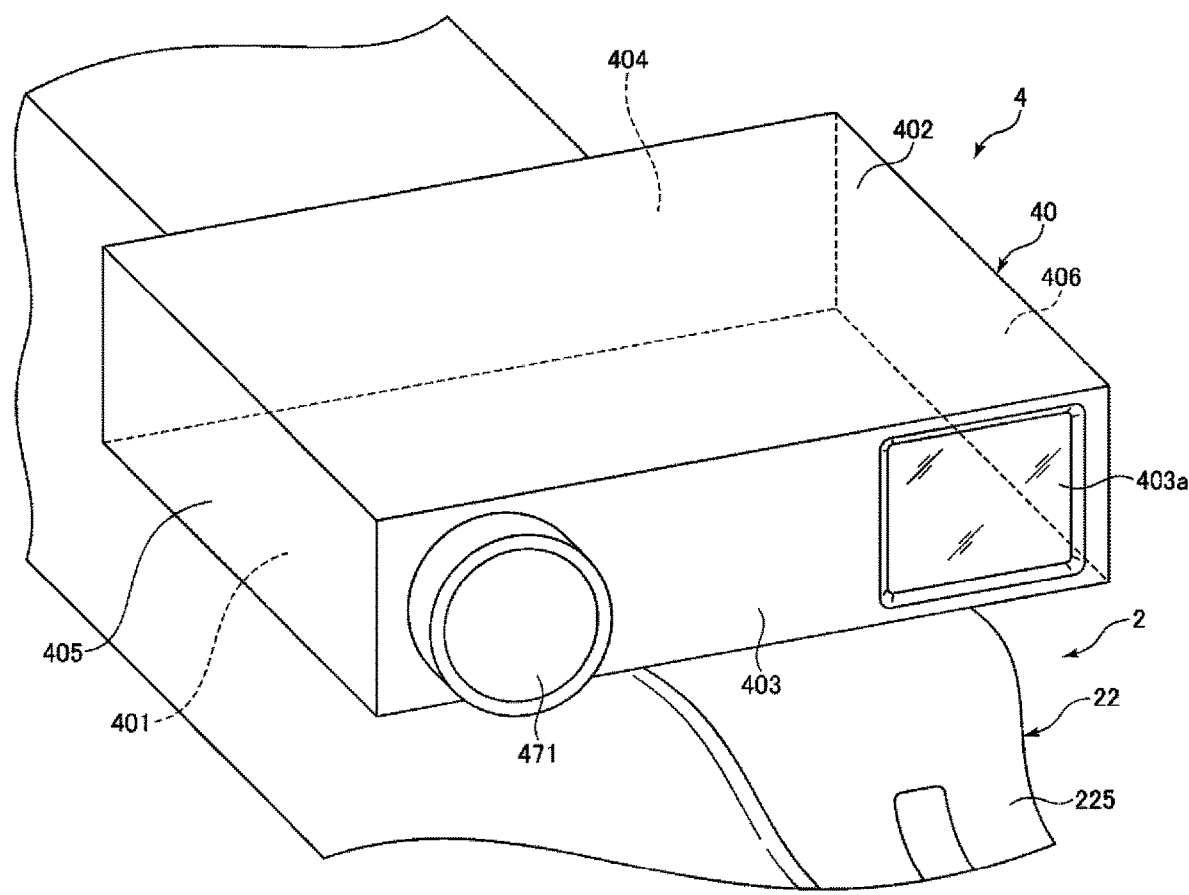
FIG. 3 is a perspective view illustrating the three-dimensional measuring apparatus illustrated in FIG. 2.
Figure 4:
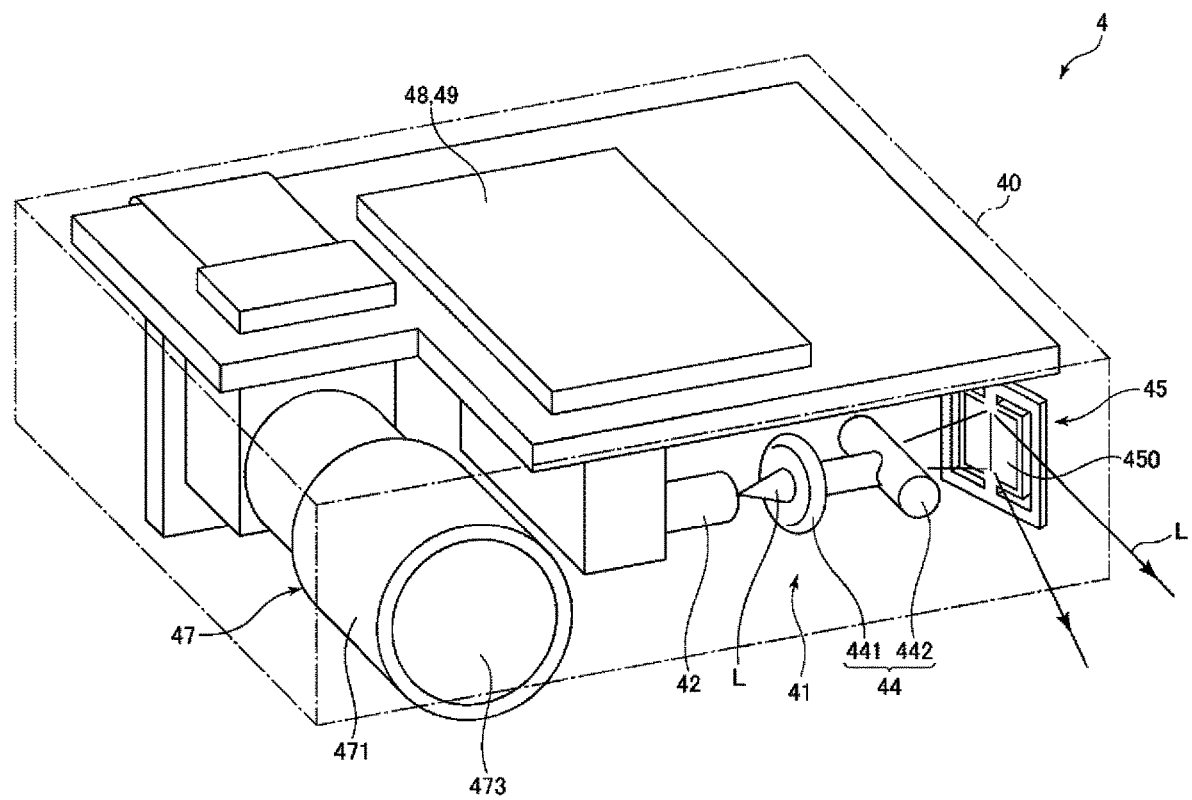
FIG. 4 is a perspective view illustrating the inside of the three-dimensional measuring apparatus illustrated in FIG. 3.
Figure 5:
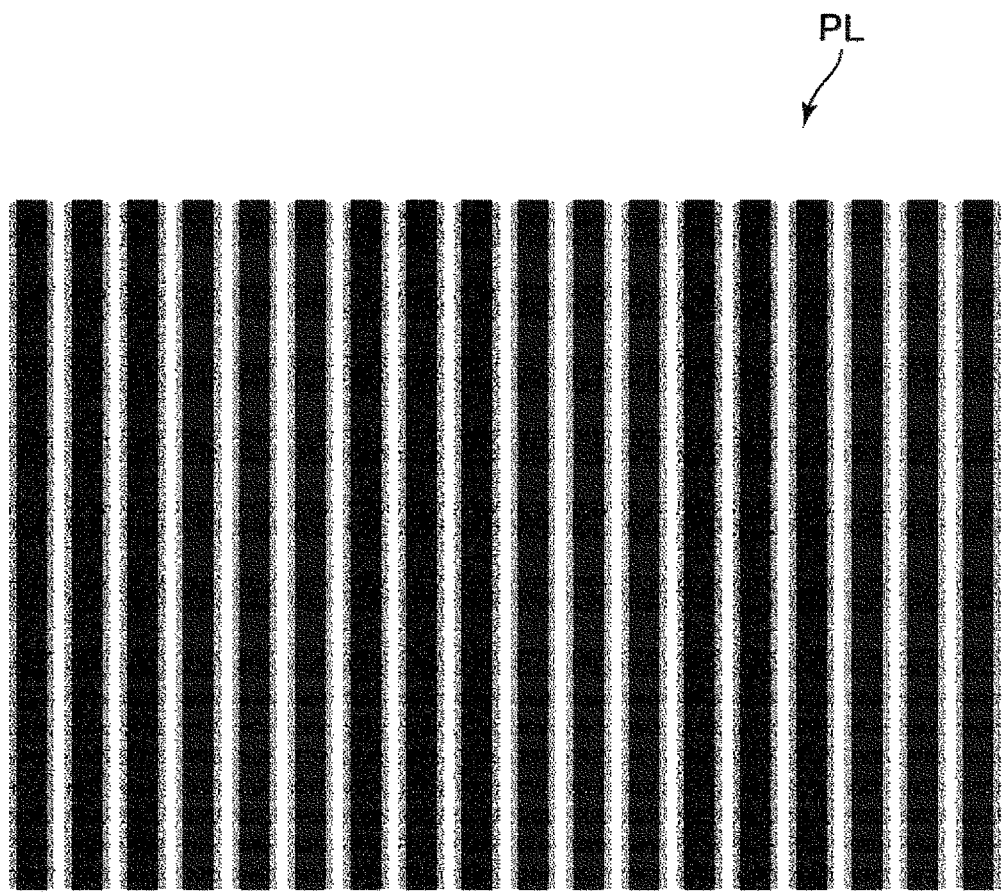
FIG. 5 is a plan view illustrating an example of pattern light projected by the projection portion illustrated in FIG. 4.
Figure 6:
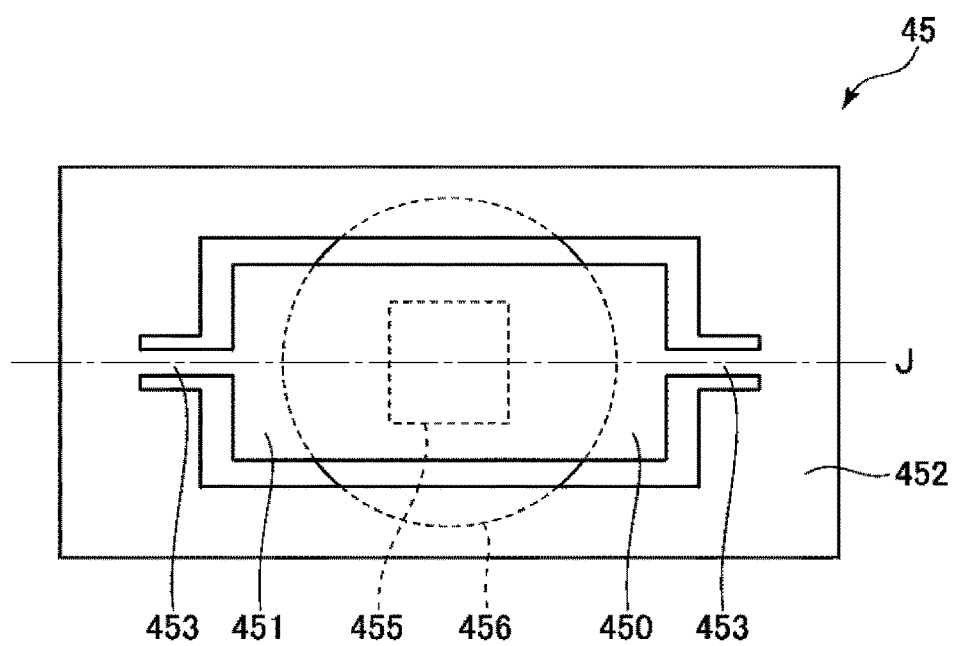
FIG. 6 is a plan view illustrating an optical scanning portion included in the three-dimensional measuring apparatus illustrated in FIG. 4.
Figure 7:
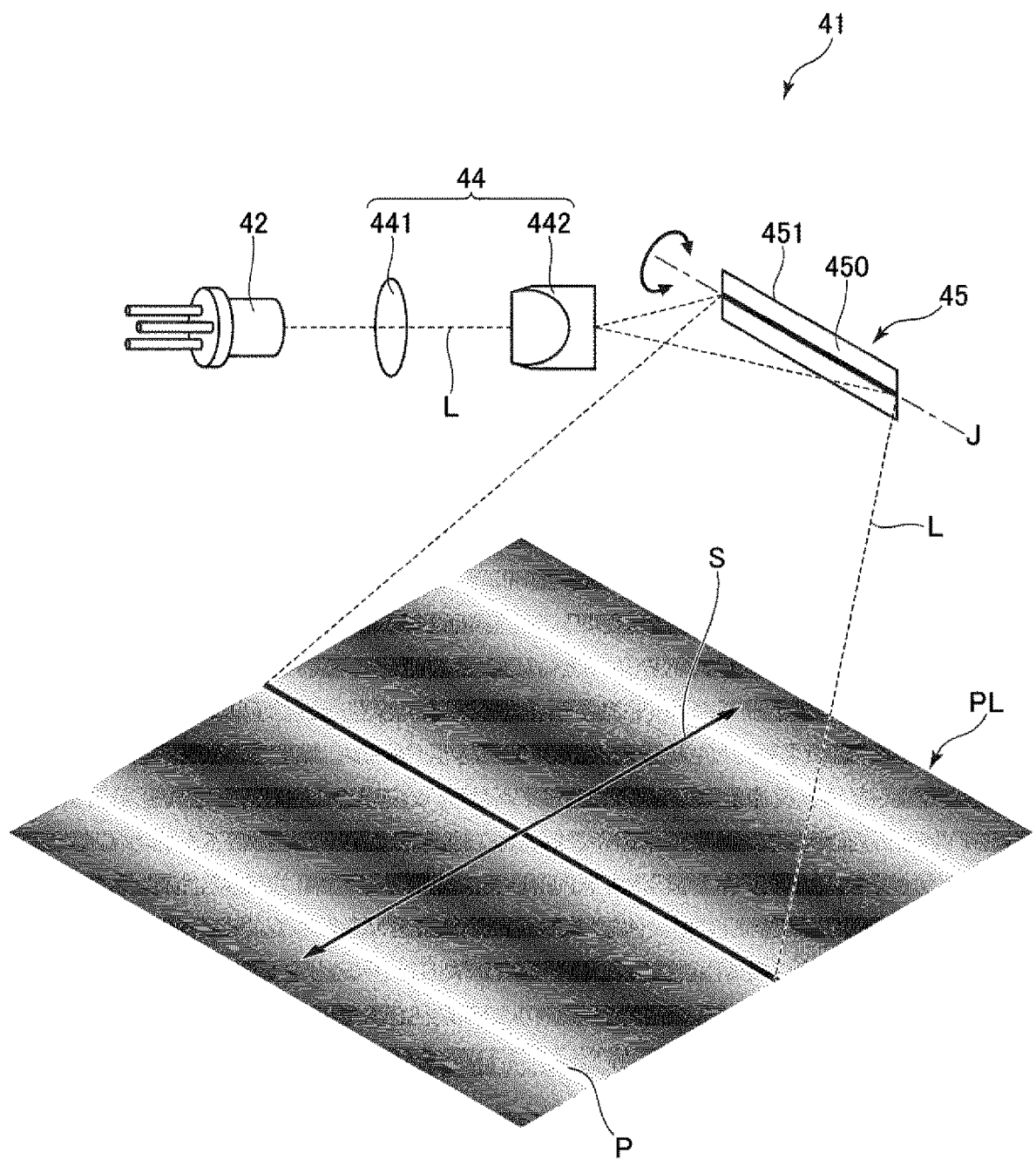
FIG. 7 is a conceptual view for describing a state where laser light is scanned by the optical scanning portion illustrated in FIG. 6 and the pattern light is projected.

FIG. 1 is a view illustrating an overall configuration of the robot system according to the first embodiment. FIG. 2 is a view illustrating an overall configuration of the three-dimensional measuring apparatus provided in the robot system illustrated in FIG. 1. FIG. 3 is a perspective view illustrating the three-dimensional measuring apparatus illustrated in FIG. 2. FIG. 4 is a perspective view illustrating the inside of the three-dimensional measuring apparatus illustrated in FIG. 3. FIG. 5 is a plan view illustrating an example of pattern light projected by the projection portion illustrated in FIG. 4. FIG. 6 is a plan view illustrating an optical scanning portion included in the three-dimensional measuring apparatus illustrated in FIG. 4. FIG. 7 is a conceptual view for describing a state where laser light is scanned by the optical scanning portion illustrated in FIG. 6 and the pattern light is projected.

A robot system 1 illustrated in FIG. 1 includes a robot 2, a three-dimensional measuring apparatus 4 that performs three-dimensional measurement of an object W using laser light L, a robot control device 5 that controls driving of the robot 2 based on the measurement result of the three-dimensional measuring apparatus 4, and a host computer 6 that can communicate with the robot control device 5. Each of the members can communicate with each other in a wired or wirelessly manner, and the communication may be performed via a network, such as the Internet.

1.2 Robot

The robot 2 is a robot that performs work, such as feeding, removing, transporting, and assembling of precision equipment or components that configure the precision equipment. However, the application of the robot 2 is not particularly limited. The robot 2 according to the embodiment is a 6-axis robot, and includes a base 21 fixed to a floor or a ceiling and a robot arm 22 coupled to the base 21 as illustrated in FIG. 1.

The robot arm 22 includes a first arm 221 that is rotatably coupled to the base 21 around a first axis O1, a second arm 222 that is rotatably coupled to the first arm 221 around a second axis O2, a third arm 223 rotatably coupled to the second arm 222 around a third axis O3, a fourth arm 224 rotatably coupled to the third arm 223 around a fourth axis O4, a fifth arm 225 rotatably coupled to the fourth arm 224 around a fifth axis O5, and a sixth arm 226 rotatably coupled to the fifth arm 225 around the sixth axis O6. Further, an end effector 24 that corresponds to the work to be executed by the robot 2 is mounted on the sixth arm 226. In the following, the end effector 24 side of the first arm 221 to the sixth arm 226 is also referred to as "distal end" or "distal end side", and the base 21 side is also referred to as "proximal end" or "proximal end side".

The robot 2 includes a first driving device 251 that rotates the first arm 221 with respect to the base 21, a second driving device 252 that rotates the second arm 222 with respect to the first arm 221, a third driving device 253 that rotates the third arm 223 with respect to the second arm 222, a fourth driving device 254 that rotates the fourth arm 224 with respect to the third arm 223, a fifth driving device 255 that rotates the fifth arm 225 with respect to the fourth arm 224, and a sixth driving device 256 that rotates the sixth arm 226 with respect to the fifth arm 225. Each of the first driving device 251 to the sixth driving device 256 includes, for example, a motor as a driving source, a controller that controls driving of the motor, and an encoder that detects a rotation amount of the motor. Each of the first driving device 251 to the sixth driving device 256 is independently controlled by the robot control device 5.

The robot 2 is not limited to the configuration of the embodiment, and for example, the number of arms of the robot arm 22 may be 1 to 5, or may be 7 or more. Further, for example, the type of the robot 2 may be a SCARA robot or a double-arm robot having two robot arms 22.

1.3 Robot Control Device

The robot control device 5 receives a position command of the robot 2 from the host computer 6 and independently controls the driving of each of the first driving device 251 to the sixth driving device 256 so as to be at a position that corresponds to the position command received by the first arm 221 to the sixth arm 226. The robot control device 5 includes, for example, a computer, and includes a processor (CPU) that processes information, a memory coupled to be capable of communicating with the processor, and an external interface. Various programs that can be executed by the processor are stored in the memory, and the processor can read and execute various programs and the like stored in the memory.

1.4 Three-Dimensional Measuring Apparatus

Next, the three-dimensional measuring apparatus 4 according to the first embodiment will be described.

The three-dimensional measuring apparatus 4 performs three-dimensional measurement of the object W using a phase shift method. As illustrated in FIG. 2, the three-dimensional measuring apparatus 4 includes a projection portion 41 that projects pattern light PL for three-dimensional measurement using the laser light L onto a region including the object W on the projection surface P, an imaging portion 47 that acquires a pattern image obtained by capturing an image of the region including the object W onto which the pattern light PL is projected, a control portion 48 that controls driving of the projection portion 41 and the imaging portion 47, a measuring portion 49 that measures a three-dimensional shape of the object W based on the pattern image A, and a housing 40 that accommodates these members.

In the embodiment, as illustrated in FIG. 3, the housing 40 is fixed to the fifth arm 225 of the robot 2. The housing 40 has a box shape, and includes a bottom surface 401 fixed to the fifth arm 225, a top surface 402 that faces the bottom surface 401, a front surface 403 positioned on the distal end side of the fifth arm 225, a back surface 404 positioned on the proximal end side of the fifth arm 225, and a pair of side surfaces 405 and 406. As illustrated in FIG. 4, the projection portion 41, the imaging portion 47, the control portion 48, and the measuring portion 49 are housed in the housing 40. However, the shape of the housing 40 is not particularly limited.

Moreover, a configuration material of the housing 40 is not particularly limited, and for example, various resins, various metals, and various ceramics can be used. However, from the viewpoint of heat dissipation, it is preferable to use a material having excellent thermal conductivity, such as aluminum or stainless steel. Further, the bottom surface 401 of the housing 40 may be configured to be fixed to the fifth arm 225 of the robot 2 via a joint portion (not illustrated).

The projection portion 41 is disposed in the housing 40 so as to irradiate the distal end side of the fifth arm 225 with the laser light L, and the imaging portion 47 faces the distal end side of the fifth arm 225 and is disposed in the housing 40 such that the image of the region including an irradiation range of the laser light L is captured. As illustrated in FIG. 3, a window portion 403a through which the laser light L is emitted is provided on the front surface 403 of the housing 40.

The arrangement of the three-dimensional measuring apparatus 4 is not particularly limited, and may be any of the first arm 221 to the fourth arm 224 or the sixth arm 226. Further, the projection portion 41 and the imaging portion 47 may be fixed to different arms. Moreover, the control portion 48 and the measuring portion 49 may be disposed outside the housing 40, and for example, may be included in the robot control device 5 or the host computer 6.

The projection portion 41 has a function of projecting the pattern light PL as illustrated in FIG. 5 onto the object W by irradiating the object W with the laser light L. As illustrated in FIGS. 2 and 4, the projection portion 41 has a laser light source 42 that emits the laser light L, an optical system 44 that includes a plurality of lenses through which the laser light L passes, and an optical scanning portion 45 that scans the laser light L that has passed the optical system 44 toward the object W. The laser light source 42 is not particularly limited, and for example, a semiconductor laser, such as a vertical cavity surface emitting laser (VCSEL) or an external cavity type vertical surface emitting laser (VECSEL), can be used.

The optical system 44 includes a condenser lens 441 that condenses the laser light L emitted from the laser light source 42 in the vicinity of the object W, and a line generating lens 442 that forms the laser light L condensed by the condenser lens 441 into a line shape that extends in a direction parallel to a swing axis J (will be described later), that is, a depth direction of a paper surface in FIG. 2.

The optical scanning portion 45 has a function of scanning the laser light L that has been formed into a line shape by the line generating lens 442. The optical scanning portion 45 is not particularly limited, and for example, a micro electro mechanical systems (MEMS), a galvanometer mirror, a polygon mirror, or the like can be used.

The optical scanning portion 45 according to the embodiment is configured with MEMS. As illustrated in FIG. 6, the optical scanning portion 45 includes a mirror 451 having a reflection surface 450, a permanent magnet 455 disposed on the back surface of the mirror 451, a support portion 452 that supports the mirror 451, a shaft portion 453 that couples the mirror 451 and the support portion 452 to each other, and an electromagnetic coil 456 disposed to be oriented toward the permanent magnet 455.

In the optical scanning portion 45, the swing axis J matches a widening direction of the laser light L widened by the line generating lens 442. Then, when a drive signal is applied to the electromagnetic coil 456, the mirror 451 swings alternately forward and reverse around the swing axis J in a predetermined cycle, and thereby, the laser light L widened in a line shape, that is, the line-shaped light, is scanned in a direction intersecting with the widening direction, and the pattern light PL having a planar shape is obtained.

Specifically, the mirror 451 reciprocally swings around the swing axis J as illustrated in FIG. 7. The reflection surface 450 of the mirror 451 that is swinging in this manner is irradiated with the widened laser light L. Then, the laser light L is scanned along a scanning direction S. As a result, the pattern light PL is projected onto the projection surface P in a planar shape.

Although the projection portion 41 has been described above, the line generating lens 442 will be described in detail later.

The imaging portion 47 captures an image of a state where the pattern light PL is projected on at least one object W. In the embodiment, as illustrated in FIG. 2, the laser light L is scanned by the mirror 451 within a range of a scanning angle $\alpha_{max}$. Accordingly, the pattern light PL is projected within the range. Meanwhile, the imaging portion 47 according to the embodiment can capture an image within the range of an angle of view β. At this time, the range of the angle of view β on the projection surface P is set to be included in the range of the scanning angle $\alpha_{max}$. In other words, the range of the angle of view β on the projection surface P is the same as the range of a drawing angle $\alpha_{disp}$ included in the scanning angle $\alpha_{max}$. Accordingly, in the imaging portion 47, the pattern light PL can be stored in the whole imaging range, and for example, measurement accuracy can be maintained constant.

The imaging portion 47 includes a camera 471 including an imaging element 472, such as a CMOS image sensor or a CCD image sensor, and a condenser lens 473, for example. The camera 471 is coupled to the measuring portion 49 and transmits the pattern image to the measuring portion 49.

The control portion 48 includes a mirror control portion 481 that controls the driving of the optical scanning portion 45 by applying the drive signal to the electromagnetic coil 456, and a light source control portion 482 that controls the driving of the laser light source 42 by applying the drive signal to the laser light source 42. The light source control portion 482 is set such that the maximum amplitude of the mirror 451 in the optical scanning portion 45 can be changed. In addition, the light source control portion 482 emits the laser light L from the laser light source 42 in synchronization with the swinging of the mirror 451, and for example, as illustrated in FIG. 5, the pattern light PL having a stripped pattern expressed by brightness of a luminance value is projected onto the object W. However, the pattern light PL is not particularly limited as long as the pattern light PL can be used for the phase shift method as will be described later. In addition, the control portion 48 includes an imaging control portion 483 that controls driving of the imaging portion 47. The imaging control portion 483 controls driving of the camera 471 and captures an image of a region including the object W at a predetermined timing.

For example, the control portion 48 projects the pattern light PL onto the object W four times with the phase shifted by π/2, and each time the pattern light PL is projected onto the object W, the image of the object W onto which the pattern light PL is projected is captured by the imaging portion 47. However, the number of times of projection of the pattern light PL is not particularly limited as long as the phase can be calculated from the imaging result. Further, phase coupling may be performed by performing similar projection and image capturing using a pattern with a large pitch or a pattern with a small pitch. As the number of types of pitches increases, the measurement range and resolution can be improved, but as the number of times of image capturing increases, the time required to acquire a pattern image increases, and the operating efficiency of the robot 2 decreases. Therefore, the number of times of projection of the pattern light PL may be appropriately set in consideration of the accuracy and measurement range of the three-dimensional measurement and the operation efficiency of the robot 2.

The measuring portion 49 performs the three-dimensional measurement of the object W based on the plurality of pattern images acquired by the imaging portion 47. Specifically, three-dimensional information including the posture of the object W, spatial coordinates, and the like is calculated. In addition, the measuring portion 49 transmits the calculated three-dimensional information of the object W to the host computer 6.

The control portion 48 and the measuring portion 49 are configured with, for example, a computer, and include a processor (CPU) that processes information, a memory coupled to be capable of communicating with the processor, and an external interface. Various programs that can be executed by the processor are stored in the memory, and the processor can read and execute various programs and the like stored in the memory.

1.5 Host Computer

The host computer 6 generates a position command for the robot 2 from the three-dimensional information of the object W calculated by the measuring portion 49 and transmits the generated position command to the robot control device 5. The robot control device 5 independently drives each of the first driving device 251 to the sixth driving device 256 based on the position command received from the host computer 6, and moves the first arm 221 to the sixth arm 226 to the designated position. In the embodiment, the host computer 6 and the measuring portion 49 are separated from each other, but the present disclosure is not limited thereto, and the host computer 6 may be equipped with a function as the measuring portion 49.

1.6 Line Generating Lens

As described above, the projection portion 41 of the three-dimensional measuring apparatus 4 according to the embodiment includes a line generating lens 442 that widens the laser light L emitted from the laser light source 42 and condensed by the condenser lens 441 in a line shape.

Figure 8:
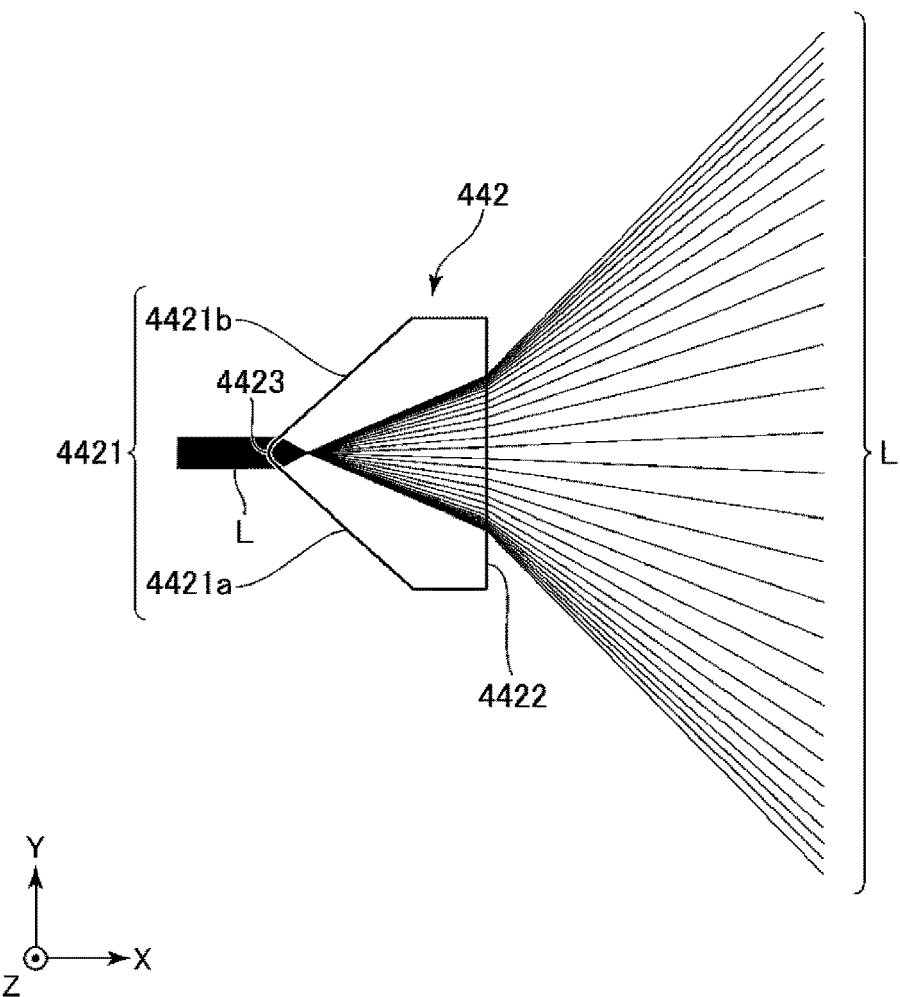
FIG. 8 is a plan view of a line generating lens illustrated in FIG. 7 when viewed from a direction orthogonal to both the laser light emitted from a laser light source and a swing axis of a mirror.

FIG. 8 is a plan view of the line generating lens 442 illustrated in FIG. 7 when viewed from a direction orthogonal to both the laser light L emitted from the laser light source 42 and the swing axis J of the mirror 451. In FIG. 8, a direction parallel to an optical axis of the laser light L incident on the line generating lens 442 is defined as an X-axis direction, a direction parallel to the swing axis J of the mirror 451 illustrated in FIG. 7 is defined as a Y-axis direction, and a direction orthogonal to the X-axis direction and the Y-axis direction is defined as a Z-axis direction.

The line generating lens 442 is also called a Powell lens, and is a lens that widens the incident light in a line shape. The line generating lens 442 illustrated in FIG. 8 has an incident surface 4421 formed in a rounded roof shape and an emission surface 4422 provided on the opposite side. Further, the incident surface 4421 includes a first surface 4421a, a second surface 4421b, and a ridge line 4423 where the surfaces intersect each other. The first surface 4421a and the second surface 4421b intersect each other at the ridge line 4423 parallel to the Z-axis direction. An angle formed by the first surface 4421a and the second surface 4421b is not particularly limited, but is set to approximately 30° to 80°, for example. Further, the cross-sectional shape of the ridge line 4423 by an X-Y plane is preferably rounded as illustrated in FIG. 8.

The line generating lens 442 refracts the laser light L having a high directivity incident on the incident surface 4421, widens the laser light L in the Y-axis direction, and forms and emits a beam into a line shape. Accordingly, the laser light L having a high directivity can be converted into linear light.

In the line generating lens 442 according to the embodiment, a luminance distribution of the emitted light that is widened in the Y-axis direction and forms a line shape has a luminance at the edge portion that is higher than the luminance at the center portion in the extending direction of the emitted light. Since such a luminance distribution is also reflected in the pattern image captured by the imaging portion 47, finally, peripheral light attenuation in the pattern image is offset or reduced in the direction intersecting the scanning direction S of the laser light L.

Hereinafter, the principle of obtaining such an effect will be described.

The pattern light PL drawn by the laser light L is imaged by the imaging portion 47. The imaging portion 47 includes the condenser lens 473, and the condenser lens 473 has a lens-specific peripheral light attenuation. It is known that a distribution of a transmission luminance TL of a general lens is expressed by the following expression (1).

$$TL = \cos^4(ax) \quad (1)$$

In the above-described expression (1), on the projection surface P, the position that corresponds to the center of the condenser lens 473 is x=0, and the luminance at x=0 is normalized to 1. Further, a coefficient a in the above-described expression (1) is an eigenvalue for each lens, and can be obtained in advance from an actual value of the peripheral light attenuation of the condenser lens 473 used in the imaging portion 47. The transmission luminance TL in the above-described expression (1) is a relative luminance of the light that has been transmitted through the lens.

Figure 9:
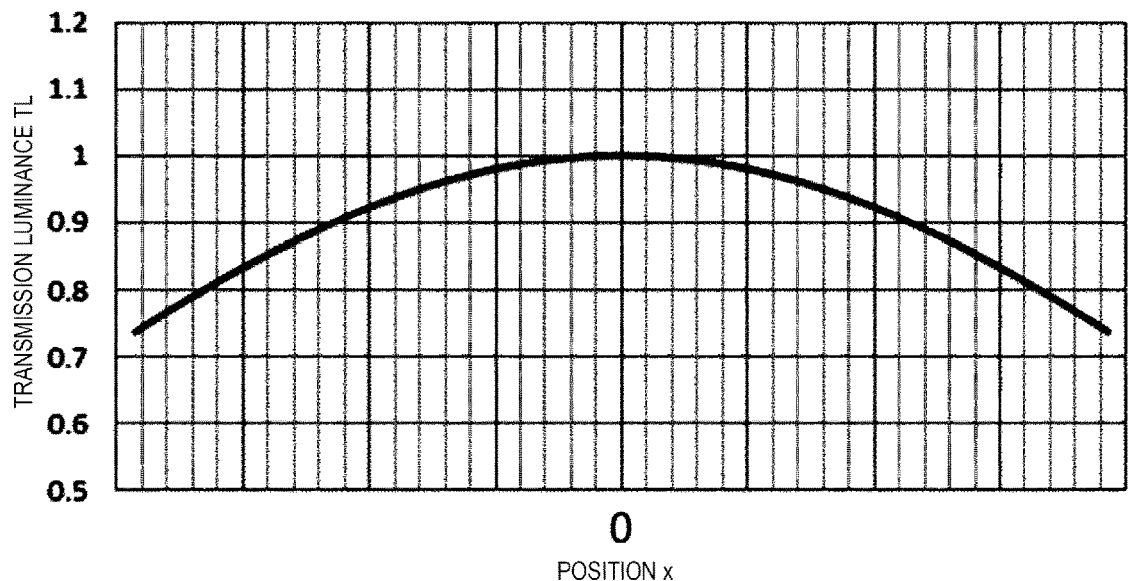
FIG. 9 is a graph illustrating an example of a distribution of a transmission luminance TL reflecting general peripheral light attenuation of the lens.

In addition, when the position x and the transmission luminance TL expressed by the above-described expression (1) are plotted in a coordinate system with the position x on the horizontal axis and the transmission luminance TL on the vertical axis, the graph illustrated in FIG. 9 is obtained. FIG. 9 is a graph illustrating an example of the distribution of the transmission luminance IL reflecting general peripheral light attenuation of the lens. In FIG. 9, the luminance at x=0 is normalized to 1.

As illustrated in FIG. 9, in the transmission luminance distribution expressed by the above-described expression (1), the transmission luminance TL at x=0 is the maximum value, and the transmission luminance TL gradually decreases as the position x goes away from the maximum value.

The decrease in the transmission luminance TL corresponds to the peripheral light attenuation.

Therefore, when the laser light L projected onto the projection surface P has a uniform luminance distribution in the direction intersecting the scanning direction S, when the image of the pattern light PL drawn by the laser light L is captured, the peripheral light attenuation occurs by the condenser lens 473 in the pattern image. As a result, in measuring the three-dimensional shape based on the pattern image, deterioration of the accuracy is caused.

Figure 10:
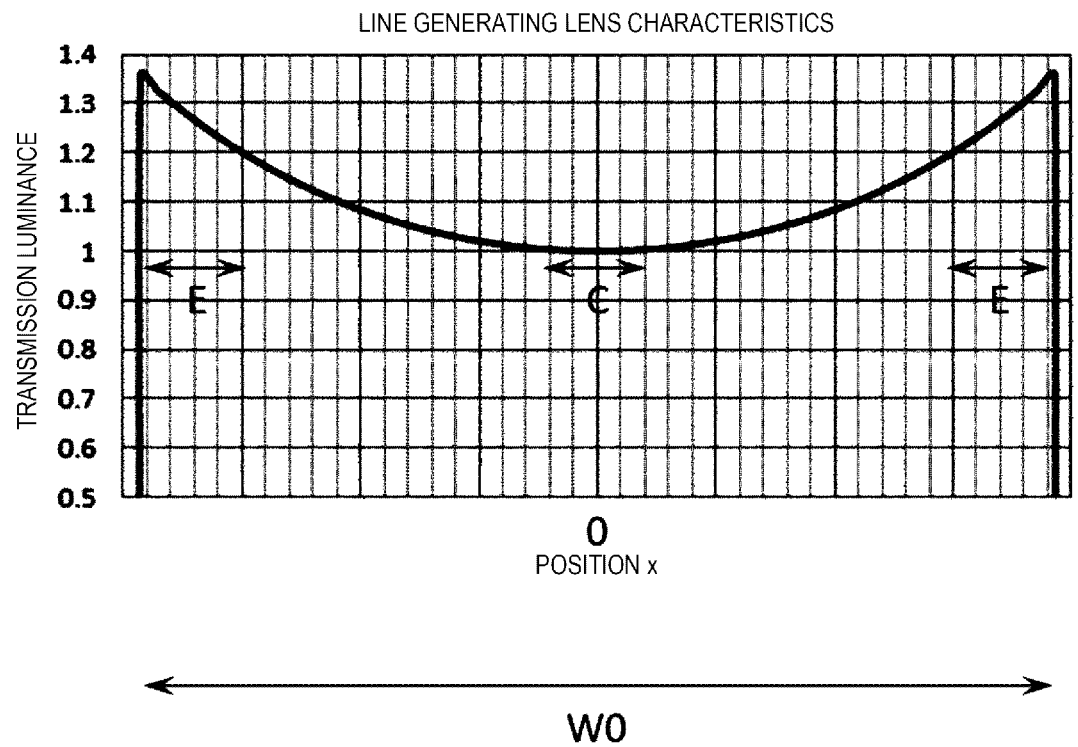
FIG. 10 is a graph illustrating an example of a transmission luminance distribution of the line generating lens.

On the other hand, in the embodiment, for example, the line generating lens 442 capable of emitting the emitted light having a transmission luminance distribution as illustrated in FIG. 10 is used. FIG. 10 is a graph illustrating an example of the transmission luminance distribution of the line generating lens 442 used in the embodiment. The transmission luminance distribution illustrated in FIG. 10 has a tendency opposite to that of the peripheral light attenuation illustrated in FIG. 9. In other words, the peripheral light attenuation illustrated in FIG. 9 is a distribution in which the transmission luminance TL tends to gradually decrease as the position x moves from the center portion to the edge portion, whereas the transmission luminance distribution illustrated in FIG. 10 is a special distribution in which the luminance tends to gradually increase as the position x moves from the center portion to the edge portion. Therefore, by using the line generating lens 442 having such a special transmission luminance distribution, it is possible to offset or reduce the peripheral light attenuation in the pattern image.

In FIG. 10, the total width of the emitted light from the line generating lens 442 is W0, and a range of 10% of the total width W0 across the center of the total width W0 is defined as a center portion C. Further, the ranges of 10% of the full width W0 starting from both ends of the full width W0 are respectively defined as edge portions E.

When the transmission luminance illustrated in FIG. 10 is line generating lens characteristics LGL, the luminance distribution that expresses the line generating lens characteristics LGL can be expressed by the following expression (2), for example.

$$LGL = \frac{1}{\cos^4(ax)} \quad (2)$$

The same numerical value as the coefficient a in the above-described expression (1) is also used for the coefficient a in the above-described expression (2). FIG. 10 is a graph in which the position x and the line generating lens characteristics LGL expressed by the above-described expression (2) are plotted in a coordinate system with the position x on the horizontal axis and the transmission luminance on the vertical axis. In FIG. 10, the luminance at x=0 is normalized to 1.

By using the line generating lens 442 that realizes the luminance distribution as illustrated in the above-described expression (2) and FIG. 10, finally, it is possible to offset or reduce the peripheral light attenuation in the pattern image.

Figure 11:
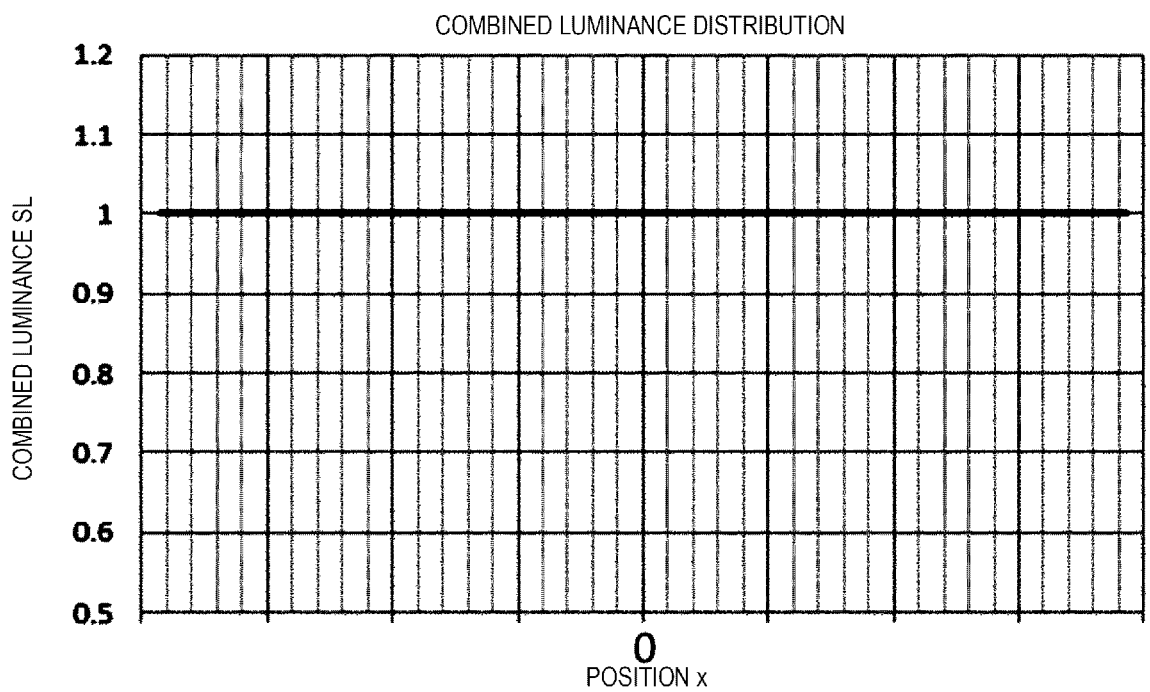
FIG. 11 is a graph illustrating a combined luminance distribution obtained by combining the transmission luminance distribution illustrated in FIG. 9 and an offset luminance distribution illustrated in FIG. 10.

FIG. 11 is a graph illustrating a combined luminance distribution obtained by combining the transmission luminance distribution illustrated in FIG. 9 and an offset luminance distribution illustrated in FIG. 10. In FIG. 11, the luminance at x=0 is normalized to 1.

The combined luminance distribution illustrated in FIG. 11 illustrates a flat distribution. Therefore, it is recognized that, by using the line generating lens 442, it is possible to acquire a pattern image in which the influence of the peripheral light attenuation is offset or reduced.

As described above, the three-dimensional measuring apparatus 4 according to the embodiment that performs the three-dimensional measurement of the object W using the laser light L, includes: the laser light source 42 that emits the laser light L; the line generating lens 442 that widens and emits the laser light L to the line-shaped light (line laser light) having the line generating lens characteristics LGL (first luminance distribution) having a higher luminance at the edge portion E than the luminance at the center portion C in the extending direction; the mirror 451 that swings around the swing axis J, reflects the line-shaped light, and projects the pattern light PL onto the projection surface P including the object W; the imaging portion 47 that captures the image of the projection surface P on which the pattern light PL is projected and acquires the pattern image; and the measuring portion 49 that obtains the three-dimensional shape of the object W based on the pattern image.

According to the three-dimensional measuring apparatus 4, the peripheral light attenuation included in the pattern image captured by the imaging portion 47 can be offset or reduced by the line generating lens characteristics LGL of the emitted light generated by the line generating lens 442. Accordingly, the three-dimensional shape of the projection surface P can be measured with high accuracy. Moreover, according to the embodiment, it is possible to offset or reduce such peripheral light attenuation at high speed without requiring time. Further, the configuration of the three-dimensional measuring apparatus 4 that realizes this is simple because it is not necessary to perform image processing or the like, and it is easy to reduce the size. Therefore, when controlling the driving of the robot 2 based on the three-dimensional information of the object W measured by the three-dimensional measuring apparatus 4, the work efficiency can be improved.

Furthermore, in the embodiment, the single line generating lens 442 realizes the widening of the laser light L and the formation of a luminance difference for offsetting or reducing the peripheral light attenuation. Therefore, there exists an advantage that the width of the widened laser light L does not extremely diverge. In other words, since the interval for inserting a correction lens or the like is not required, the distance between the line generating lens 442 and the mirror 451 can be reduced, and the reflection surface 450 of the mirror 451 can be emitted before the laser light L does not extremely diverge. Accordingly, the size of the reflection surface 450 can be reduced. In a case where the reflection surface 450 is large, a large air resistance is received when swinging, and thus, a large torque is required for swinging, and the mirror 451 is easily bent. On the other hand, when the reflection surface 450 can be reduced, the torque can be reduced and the mirror 451 is also unlikely to bend.

The shape of the line generating lens 442 can be obtained from the above-described line generating lens characteristics LGL of the emitted light based on a simulation, such as a ray tracing method. In other words, for example, when the distribution of the line generating lens characteristics LGL expressed by the above-described expression (2) is a distribution that can offset or reduce the peripheral light attenuation expressed by the above-described expression (1), the shape of the line generating lens 442 is not limited to the shape illustrated in FIG. 8 and may be any shape.

Further, the luminance difference between the center portion C and the edge portion E in the line generating lens characteristics LGL may be determined corresponding to the degree of the peripheral light attenuation of the condenser lens 473, and is not particularly limited, but for example, in the graph illustrated in FIG. 10, when the line generating lens characteristics LGL at x=0 is 1, the maximum value of the line generating lens characteristics LGL is preferably 1.05 or more and 2.00 or less, and more preferably 1.10 or more and 1.80 or less. By using the line generating lens 442 having such line generating lens characteristics LGL, it is possible to more reliably offset or reduce the influence of the peripheral light attenuation.

In addition, the luminance distribution due to the peripheral light attenuation is not limited to the distribution illustrated in the above-described expression (1) and FIG. 9. Further, the luminance of the center portion C and the luminance of the edge portion E are maximum values of the luminance in each range.

Modification Example

Here, a modification example of the first embodiment will be described. The modification example is the same as the first embodiment except for the following differences.

Figure 12:
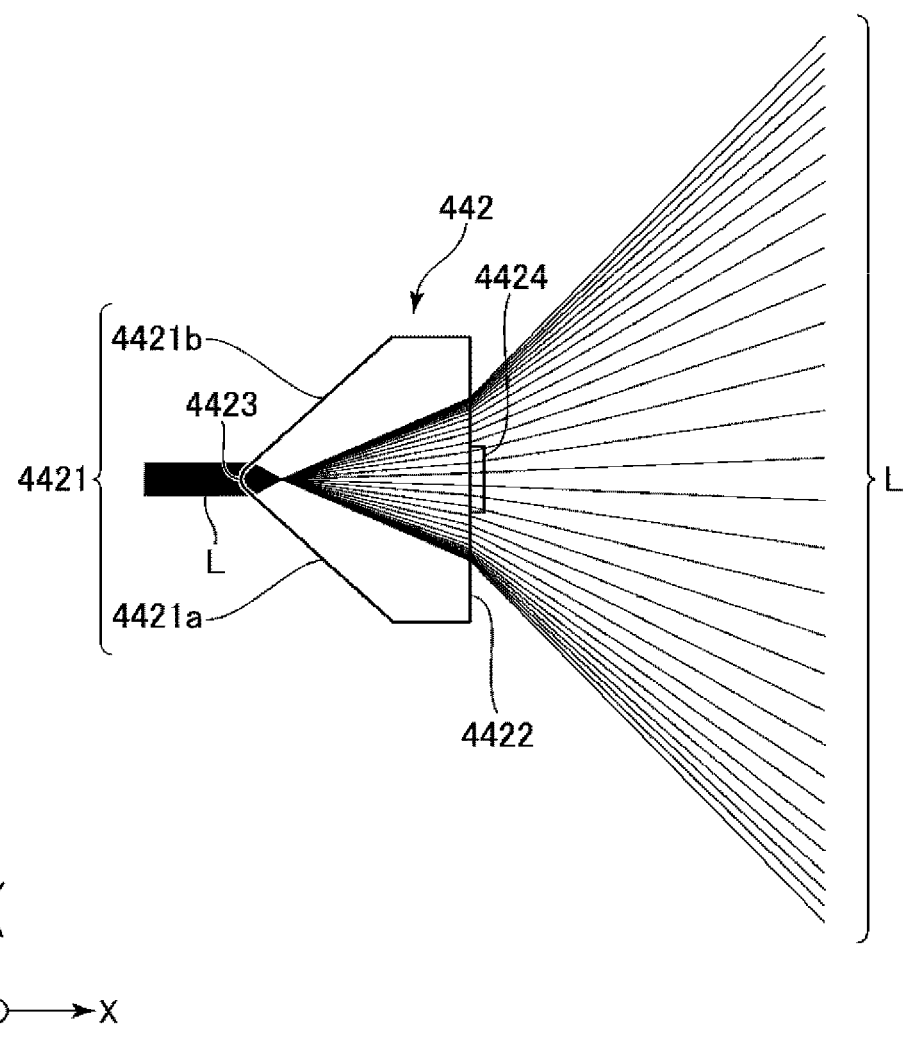
FIG. 12 is a view illustrating a line generating lens according to a modification example of the first embodiment.

FIG. 12 is a view illustrating the line generating lens 442 according to the modification example of the first embodiment.

Hereinafter, the modification example will be described, but in the following description, differences from the above-described first embodiment will be mainly described, and descriptions of the same contents will be omitted.

The shape of the line generating lens 442 illustrated in FIG. 12 is designed so as to form a uniform luminance distribution, for example. In other words, in the line generating lens 442 according to the above-described first embodiment, the line generating lens characteristics LGL in which the light is refracted on the inside and the luminance of the edge portion E is higher than the luminance of the center portion C of the width due to the design of the shape are obtained, but in the modification example, the shape itself is designed, for example, such that the emitted light having a uniform luminance distribution can be obtained.

Meanwhile, the line generating lens 442 illustrated in FIG. 12 has a light attenuation film 4424 that is provided at the center portion of the emission surface 4422 in the Y-axis direction and attenuates the light. Accordingly, the line generating lens 442 is set such that a transmittance at a part (a part through which the line laser light center portion is transmitted) that corresponds to the center portion C of the line generating lens characteristics LGL (first luminance distribution), that is, a part of the light attenuation film 4424 is lower than a transmittance at a part (a part through which the line laser light edge portion is transmitted) that corresponds to the edge portion E of the line generating lens characteristics LGL, that is, a part of the emission surface 4422 on which the light attenuation film 4424 is not provided.

Accordingly, a general line generating lens optically designed such that the line generating lens characteristics LGL are uniform can be used as the line generating lens 442 according to the embodiment. As a result, the line generating lens 442 can be easily designed and the cost of the three-dimensional measuring apparatus 4 can be reduced.

In addition, the light attenuation film 4424 may be any film as long as the light can be attenuated by absorption, scattering, or the like. A light attenuation rate may be constant throughout the light attenuation film 4424 or may be partially different, but is preferably set such that the light attenuation rate gradually changes. Accordingly, an offset luminance distribution as illustrated in FIG. 10 can be realized.

Further, the light may be attenuated by a method other than the method using the light attenuation film 4424. For example, the configuration material of the line generating lens 442 may be partially different, and the transmittance of the part that corresponds to the center portion C may be lowered accordingly.

Second Embodiment

Next, a second embodiment will be described.

Figure 13:
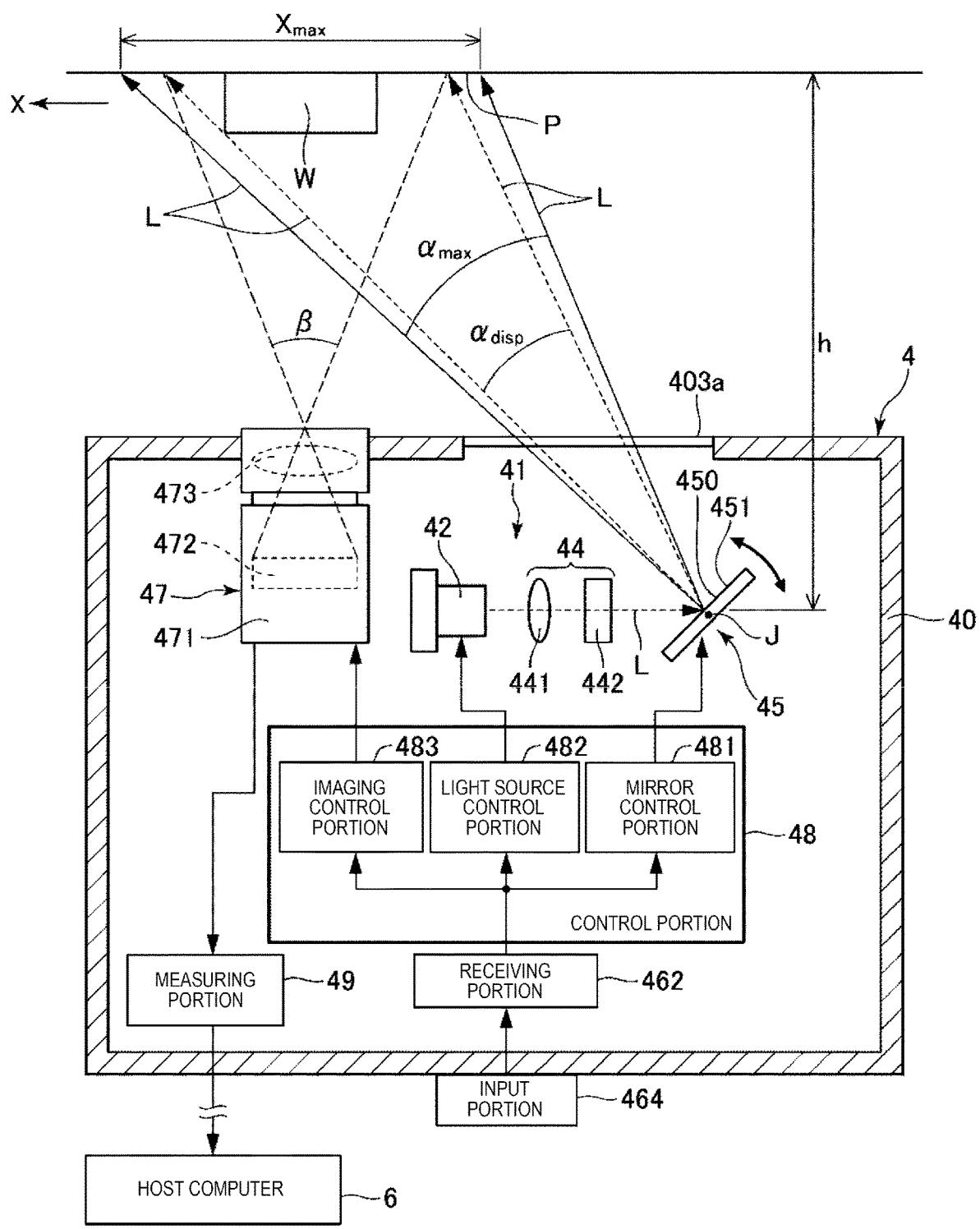
FIG. 13 is a view illustrating an overall configuration of a three-dimensional measuring apparatus according to a second embodiment.
Figure 14:
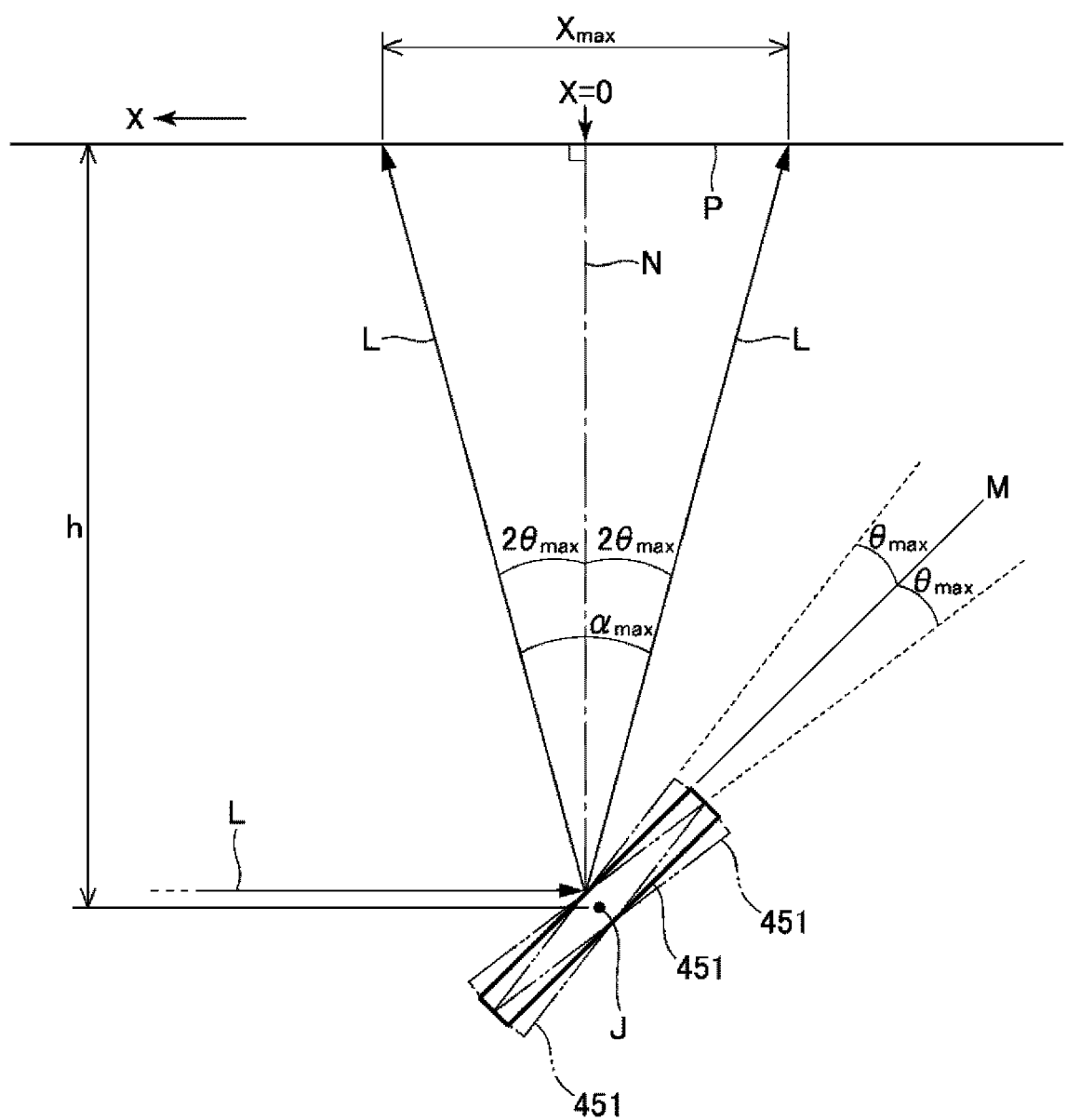
FIG. 14 is a simplified view of FIG. 13 for describing an operation of the three-dimensional measuring apparatus according to the second embodiment.

FIG. 13 is a view illustrating an overall configuration of the three-dimensional measuring apparatus according to the second embodiment. FIG. 14 is a simplified view of FIG. 13 for describing an operation of the three-dimensional measuring apparatus according to the second embodiment.

Hereinafter, the second embodiment will be described, but in the following description, differences from the first embodiment will be mainly described, and descriptions of the same contents will be omitted. In addition, in FIGS. 13 and 14, the same configurations as those in the first embodiment will be given the same reference numerals.

Similar to the first embodiment, the three-dimensional measuring apparatus 4 according to the second embodiment is the same as the three-dimensional measuring apparatus 4 according to the first embodiment except that the three-dimensional measuring apparatus 4 is configured not only to offset or reduce the peripheral light attenuation of the pattern image in the direction intersecting the scanning direction S of the laser light L, but also to offset or reduce the peripheral light attenuation in the scanning direction S.

Specifically, the three-dimensional measuring apparatus 4 illustrated in FIG. 13 further includes a receiving portion 462 coupled to the control portion 48 and an input portion 464 coupled to the receiving portion 462. Further, the control portion 48 is set such that the maximum amplitude of the mirror 451 in the optical scanning portion 45 can be changed.

In FIG. 14, it is assumed that the pattern light PL is projected onto the planar projection surface P. Further, for convenience of description, it is assumed that the laser light L is scanned within the range of the above-described scanning angle $\alpha_{max}$ around a perpendicular line N extending from the swing axis J of the mirror 451 to the projection surface P. In addition, the position on the projection surface P is expressed by x, and the intersection of the perpendicular line N and the projection surface P is x=0. Further, the distance between the swing axis J of the mirror 451 of the optical scanning portion 45 and the projection surface P is h.

The receiving portion 462 according to the embodiment receives distance information of the distance h. The distance information of the distance h received by the receiving portion 462 is input to the control portion 48. Although the distance h can also be measured based on captured images captured by various distance sensors or the imaging portion 47, the embodiment further includes the input portion 464 for inputting the distance h. When the user of the three-dimensional measuring apparatus 4 inputs the distance information of the distance h to the input portion 464, the distance information of the distance h is input from the input portion 464 to the control portion 48 via the receiving portion 462.

The control portion 48 controls the swing of the mirror 451 based on the distance h input in this manner. The control method will be described later in detail.

Three-Dimensional Measuring Method

Next, a three-dimensional measuring method using the three-dimensional measuring apparatus 4 according to the second embodiment will be described.

Figure 15:
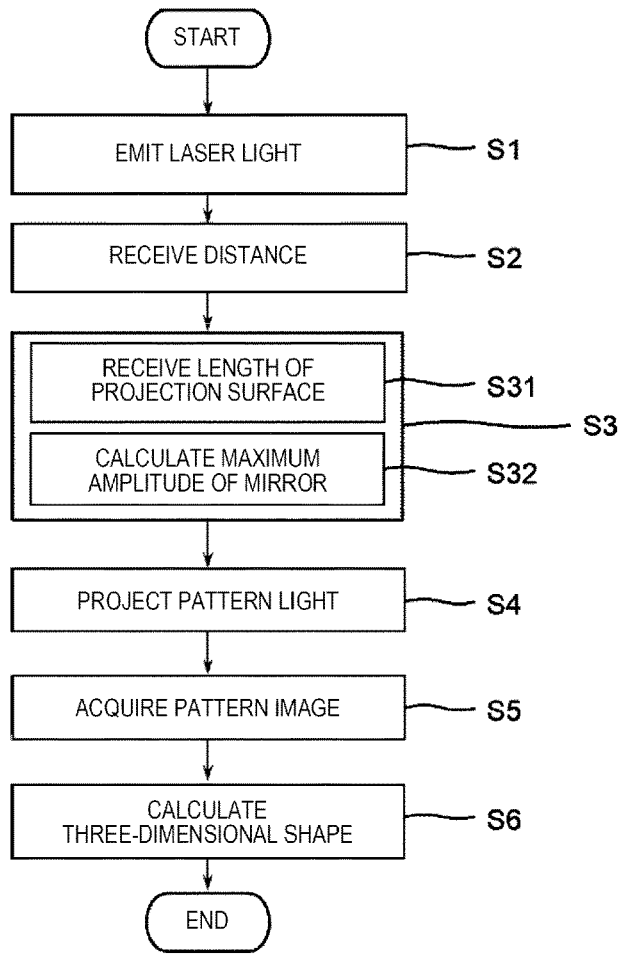
FIG. 15 is a flowchart for describing a three-dimensional measuring method using the three-dimensional measuring apparatus according to the second embodiment.

FIG. 15 is a flowchart for describing the three-dimensional measuring method using the three-dimensional measuring apparatus 4 according to the second embodiment.

The three-dimensional measuring method illustrated in FIG. 15 includes: step S1 of emitting the laser light L; step S2 of receiving the distance h between the swing axis J of the mirror 451 and the projection surface P on which the laser light L is projected by reflecting the laser light L toward the object W by the mirror 451; step S3 of determining a maximum amplitude $\theta_{max}$ of the swing of the mirror 451 based on the distance h; step S4 of projecting the pattern light PL by swinging the mirror 451 within the range of the maximum amplitude $\theta_{max}$ and by reflecting the laser light L toward the projection surface P by the mirror 451; step S5 of acquiring the pattern image obtained by capturing the image of the projection surface P on which the pattern light PL is projected; and step S6 of obtaining the three-dimensional shape of the object W based on the pattern image.

According to such a three-dimensional measuring method, as will be described in detail later, even in the scanning direction of the laser light L, it is possible to offset or reduce the peripheral light attenuation included in the pattern image captured by the imaging portion 47, that is, the problem that the luminance decreases as going closer to the edge portion of the pattern image, by the luminance distribution based on the scanning speed distribution of the projected laser light L. Accordingly, the three-dimensional shape of the object W can be measured with high accuracy.

Hereinafter, each step will be described.

[1] When measuring the three-dimensional shape of the object W, first, step S1 of emitting the laser light L from the laser light source 42 is performed. The laser light L is formed into a line shape by the line generating lens 442 and is emitted onto the reflection surface 450 of the mirror 451.

[2] Meanwhile, the receiving portion 462 performs step S2 of receiving the distance information regarding the distance h between the swing axis J of the mirror 451 and the projection surface P including the object W.

The three-dimensional measuring apparatus 4 illustrated in FIG. 13 includes an input portion 464 that inputs the distance h as an example of the apparatus configuration. When the user of the three-dimensional measuring apparatus 4 inputs the distance h from the input portion 464, the information is output to the receiving portion 462. Then, the receiving portion 462 receives the distance h input to the input portion 464 and inputs the distance h to the control portion 48. In this manner, since the more optimal maximum amplitude $\theta_{max}$ can be obtained by using the more accurate distance h actually measured by the user, more accurate three-dimensional measurement can be performed. When the distance h is within a predetermined range, a value that represents the predetermined range may be used as the distance information regarding the distance h.

[3] Next, the mirror control portion 481 performs step S3 of determining the maximum amplitude $\theta_{max}$ of the swing of the mirror 451 based on the distance h. The maximum amplitude $\theta_{max}$ is the maximum angle of separation from a center plane M of the swing as illustrated in FIG. 8 when the mirror 451 swings around the swing axis J.

The mirror 451 swings based on the Lorentz force that acts between the permanent magnet 455 mounted on the mirror 451 and the electromagnetic coil 456. An alternating voltage having a so-called sinusoidal wave waveform is applied to the electromagnetic coil 456. In other words, the mirror 451 is preferably a non-resonantly driven mirror that is swung by a drive signal having a sinusoidal wave waveform. When the mirror 451 is provided, the maximum amplitude $\theta_{max}$ can be changed relatively freely. At this time, a deflection angle θ of the mirror 451 changes with time in accordance with the alternating voltage within the range of the maximum amplitude $\theta_{max}$. Specifically, assuming that the frequency of the alternating voltage, that is, the driving frequency of the mirror 451 is f and the time is t, the time change of the deflection angle θ of the mirror 451 is expressed by the following expression (3).

$$\theta = \theta_{max} \sin(2\pi f t) \tag{3}$$

In the three-dimensional measuring apparatus 4 according to the embodiment, the maximum amplitude $\theta_{max}$ included in the expression (3) can be appropriately changed. The maximum amplitude $\theta_{max}$ has a correlation (which will be described later) with respect to the luminance distribution of the pattern image captured by the imaging portion 47 together with the distance h. Therefore, in light of this correlation, by selecting the optimum maximum amplitude $\theta_{max}$ based on the distance h, it is possible to finally acquire a pattern image in which the peripheral light attenuation is suppressed based on the principle which will be described later. In addition, the alternating voltage applied to the electromagnetic coil 456 is not limited to a voltage having a sinusoidal wave waveform, and may have a waveform that approximates a sine wave in a pseudo manner.

More specifically, step S3 includes step S31 of receiving a length $X_{max}$ (projection surface length) on the projection surface P in the scanning direction S of the laser light L that accompanies the swing of the mirror 451, and step S32 of obtaining the maximum amplitude $\theta_{max}$ based on the relational expression of the position x in the scanning direction S within the range of the length $X_{max}$ of the projection surface P, the distance h, the maximum amplitude $\theta_{max}$ to be obtained, and the estimated luminance at the position x estimated in the pattern image captured by the imaging portion 47. According to such steps S31 and S32, it is possible to easily calculate the maximum amplitude $\theta_{max}$ that can suppress the peripheral light attenuation.

The length $X_{max}$ of the projection surface P received in step S31 is a length determined by the distance h and the angle of view β of the imaging portion 47. The angle of view β is known because the angle of view is determined depending on the design of the imaging portion 47, particularly the magnification of the condenser lens 473, the distance between the imaging element 472 and the condenser lens 473, and the like. As described above, the range of the angle of view β on the projection surface P is set to be included in the scanning range of the laser light L. Therefore, the length $X_{max}$ is set to be at least longer than the length of the imaging range by the imaging portion 47.

Meanwhile, the distance h is information received by the above-described receiving portion 462. Accordingly, in step S31, the length $X_{max}$ of the projection surface P may also be input to the receiving portion 462 via the input portion 464, or may be calculated in the receiving portion 462 based on the distance h received by the receiving portion 462 and the angle of view β input in advance.

In step S32, the maximum amplitude $\theta_{max}$ is obtained by using the relational expression of the position x within the range of the length $X_{max}$ of the projection surface P, the distance h, the maximum amplitude $\theta_{max}$ to be obtained, and the estimated luminance EL estimated in the pattern image finally captured by the imaging portion 47. As an example of this relational expression, the following expression (4) can be given.

$$EL = \frac{\cos^4(ax) \cdot \cos\left[\tan^{-1}\left(\frac{x}{h}\right)\right]^3}{\cos\left(\sin^{-1}\left\{\frac{\tan^{-2}\left(\frac{x}{h}\right)}{2\theta_{max}}\right\}\right)} \tag{4}$$

provided that, in the above-described expression (4), $$-(X_{max}/2) \le x \le (X_{max}/2) \tag{5}.$$

The estimated luminance EL is a relative value of the estimated luminance within the range of the length $X_{max}$ of the projection surface P when the estimated luminance of the pattern image at the center of the length of the projection surface P is normalized to 1. Furthermore, the position x on the projection surface P is a position when the intersection of the perpendicular line N and the projection surface P is x=0 when the perpendicular line N extends from the swing axis J to the projection surface P as illustrated in FIG. 14. The coefficient a is an eigenvalue for each lens and is known as will be described later. The distance h in the above-described expression (4) may be an actually measured value of the distance between the swing axis J of the mirror 451 and the projection surface P including the object W, but may be a converted value calculated based on the measurement value, that is, "distance information". For example, when the actually measured distance is within the range of 300 to 400 mm, the distance h in the above-described expression (4) may be fixed to a representative value of 300 mm. This also applies to each expression which will be described later.

In the relational expression expressed by the above-described expression (4), an estimated value of a decrease in luminance due to the peripheral light attenuation generated in the optical system included in the imaging portion 47 is added. Therefore, by appropriately selecting the maximum amplitude $\theta_{max}$ in this step S3, the estimated luminance EL can be made constant regardless of the position x on the projection surface P according to the principle which will be described later. As a result, finally, it is possible to acquire a pattern image in which the peripheral light attenuation is offset or reduced.

In summary, step S3 of obtaining the maximum amplitude $\theta_{max}$ is a step of obtaining the maximum amplitude $\theta_{max}$ such that the value obtained by performing the normalization with respect to the estimated luminance of the position x in the scanning direction S in the region becomes a constant value (such that the estimated luminance EL which is a relative value with respect to the normalized estimated luminance becomes a constant value within the range of the length $X_{max}$) when the center of the length $X_{max}$ of the projection surface P, that is, the center in the scanning direction S of the region on the projection surface P on which the laser light L is projected when the estimated luminance at x=0 is normalized to 1, is the center position, and the estimated center luminance which is the estimated luminance of the center position is normalized to 1.

Specifically, the estimated luminance EL is preferably 0.80 or more and 1.20 or less, more preferably 0.90 or more and 1.10 or less, and still more preferably 0.95 or more and 1.05 or less. The estimated luminance EL is sufficiently close to the normalized estimated luminance, and can be regarded as a constant value. Therefore, finally, it is possible to acquire a pattern image in which the peripheral light attenuation is sufficiently suppressed and the luminance distribution is flat. Therefore, in step S32, the maximum amplitude $\theta_{max}$ may be selected such that the estimated luminance EL becomes such a constant value. In addition, steps S2 to S3 may be executed only once when there is no change in distance information regarding the distance h, or when there is little change, and steps from S2 to S3 may be omitted in the subsequent measurements.

[4] Next, within the range of the obtained maximum amplitude $\theta_{max}$, a drive signal is generated in the mirror control portion 481, and the mirror 451 is swung. Accordingly, the laser light L is reflected by the mirror 451 toward the projection surface P. In this manner, step S4 of projecting the pattern light PL is performed.

As described above, since the pattern light PL is formed by scanning the laser light L by the swing of the mirror 451 with the maximum amplitude $\theta_{max}$ optimized, the scanning speed distribution that offsets or reduces the peripheral light attenuation is provided.

Hereinafter, the principle of obtaining such an effect will be described.

First, the scanning speed of the laser light L to be scanned differs at a position on the projection surface P and has a distribution. Therefore, the scanning speed distribution is a relationship between the position x on the projection surface P and the scanning speed $v_x$ of the laser light L.

Specifically, the distance between the swing axis J and the projection surface P is h, the position on the projection surface P is x, the scanning speed of the laser light L on the projection surface P is $v_x$, and the maximum amplitude of the mirror 451 is $\theta_{max}$, and the swing frequency of the mirror 451 is f, the scanning speed distribution is expressed by the following expression (6).

$$v_x = \frac{4\pi f \theta_{max} \cos\left(\sin^{-1}\left\{\frac{\tan^{-1}\left(\frac{x}{h}\right)}{2\theta_{max}}\right\}\right)}{\cos\left[\tan^{-1}\left(\frac{x}{h}\right)\right]^2} \quad (6)$$

In such a scanning speed distribution, the scanning speed $v_x$ decreases as the position x on which the laser light L is mounted moves away from the center of the length $X_{max}$ of the projection surface P.

Here, in the above-described expression (6), when the scanning speed $v_x$ when x=0 is normalized to 1, the scanning speed $v_x$ is expressed by the following expression (7).

$$v_x = \frac{\cos\left(\sin^{-1}\left\{\frac{\tan^{-1}\left(\frac{x}{h}\right)}{2\theta_{max}}\right\}\right)}{\cos\left[\tan^{-1}\left(\frac{x}{h}\right)\right]^2} \quad (7)$$

Figure 16:
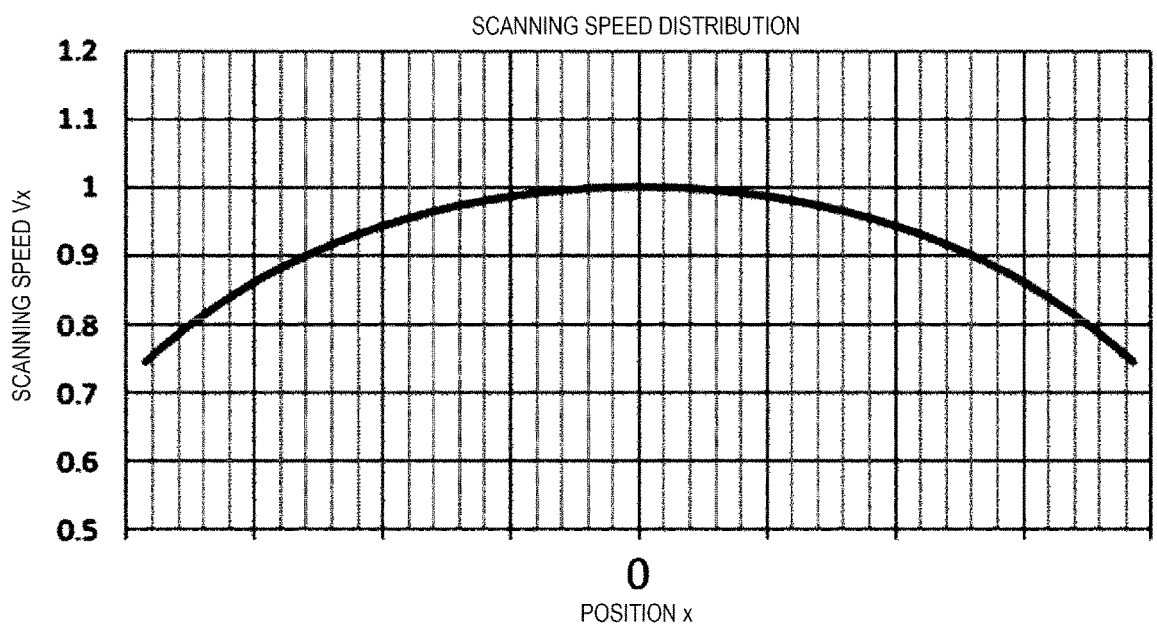
FIG. 16 is a graph illustrating an example of a scanning speed distribution of the laser light.

In addition, when the position x and the scanning speed $v_x$ expressed by the above-described expression (7) are plotted in a coordinate system with the position x on the horizontal axis and the scanning speed $v_x$ on the vertical axis, the graph illustrated in FIG. 16 is obtained. In other words, FIG. 16 is a graph illustrating an example of the scanning speed distribution of the laser light L.

As illustrated in FIG. 16, in the scanning speed distribution expressed by the above-described expression (7), as the position x is separated from the center of the length $X_{max}$ of the projection surface P, that is, a position at which the scanning speed $v_x$ at x=0 becomes the maximum value, the scanning speed $v_x$ gradually decreases.

Here, the scanning speed $v_x$ of the laser light L is inversely proportional to the luminance, for example. Therefore, by taking the reciprocal of the scanning speed $v_x$, a converted luminance CL of the projection surface P can be calculated from the above-described expression (7). The converted luminance CL is expressed by the following expression (8).

$$CL = \frac{\cos\left[\tan^{-1}\left(\frac{x}{h}\right)\right]^2}{\cos\left(\sin^{-1}\left\{\frac{\tan^{-1}\left(\frac{x}{h}\right)}{2\theta_{max}}\right\}\right)} \quad (8)$$

Figure 17:
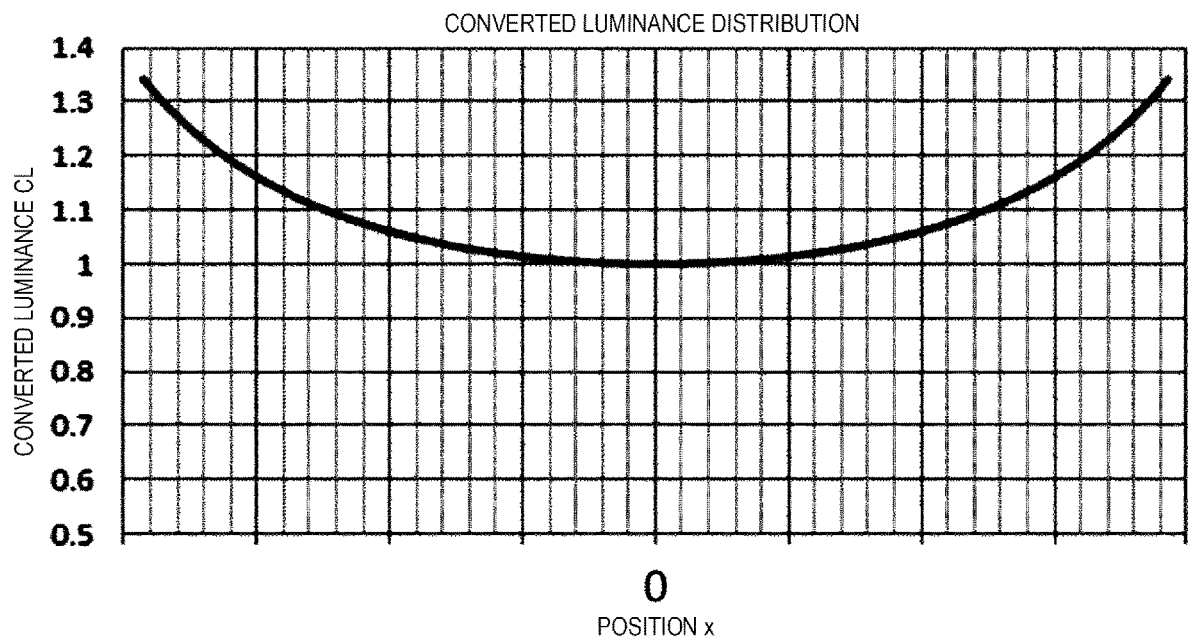
FIG. 17 is a graph illustrating an example of a distribution of a converted luminance observed on a projection surface when the laser light is scanned with the scanning speed distribution illustrated in FIG. 16.

In addition, when the position x and the converted luminance CL expressed by the above-described expression (8) are plotted in a coordinate system with the position x on the horizontal axis and the converted luminance CL on the vertical axis, the graph illustrated in FIG. 17 is obtained. In other words, FIG. 17 is a graph illustrating an example of the distribution of the converted luminance CL observed on the projection surface P when the laser light L is scanned with the scanning speed distribution illustrated in FIG. 16.

As illustrated in FIG. 17, in the converted luminance distribution expressed by the above-described expression (8), as the position x is separated from the center of the length $X_{max}$ of the projection surface P, that is, a position at which the converted luminance CL at x=0 becomes the maximum value, the converted luminance CL gradually increases.

Meanwhile, the imaging portion 47 includes the condenser lens 473, but the condenser lens 473 has a lens-specific peripheral light attenuation as described above. It is known that the distribution of the transmission luminance TL of a general lens is expressed by the following expression (1).

Here, when the converted luminance distribution expressed by the above-described expression (8) and the transmission luminance distribution expressed by the above-described expression (1) are combined, the luminance distribution in the pattern image captured by the imaging portion 47 is obtained.

The luminance distribution is a flat distribution in which the influence of the peripheral light attenuation is suppressed. Specifically, when the converted luminance distribution expressed by the above-described expression (8) and the transmission luminance distribution expressed by the above-described expression (1) are combined, a combined luminance SL is expressed by the following expression (9).

$$SL = \frac{\cos^4(ax) \cdot \cos\left[\tan^{-1}\left(\frac{x}{h}\right)\right]^2}{\cos\left(\sin^{-1}\left\{\frac{\tan^{-1}\left(\frac{x}{h}\right)}{2\theta_{max}}\right\}\right)} \quad (9)$$

Figure 18:
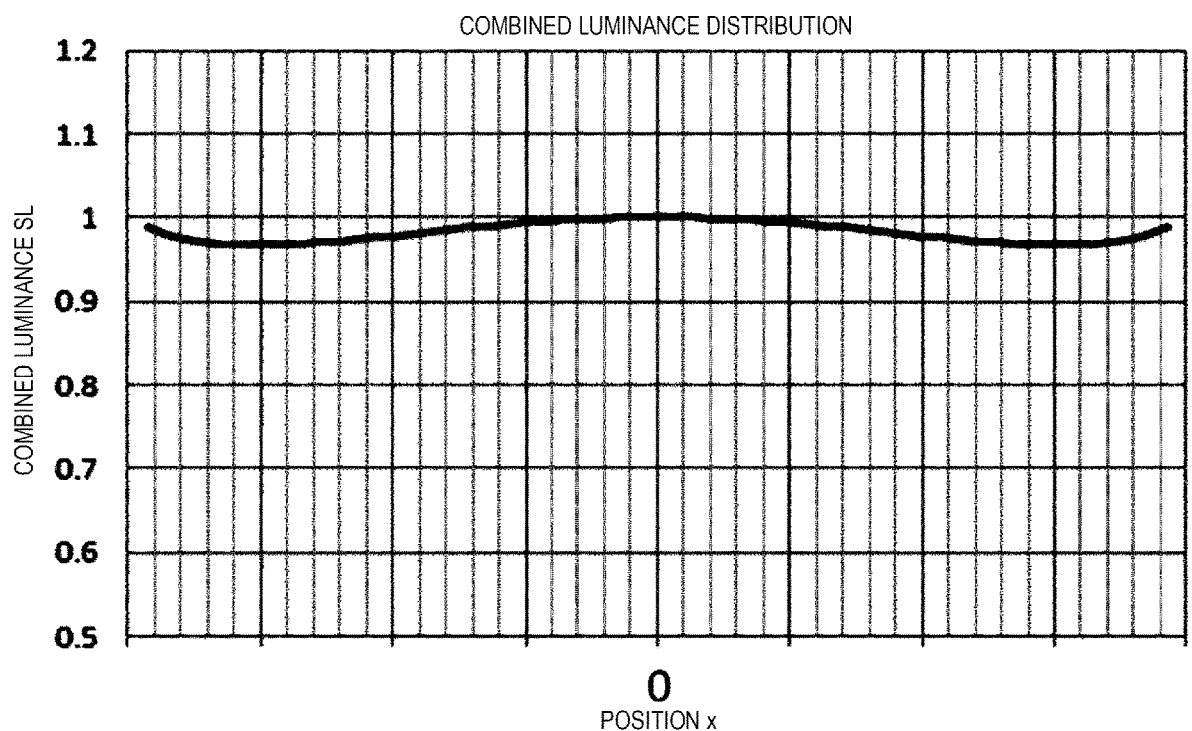
FIG. 18 is a graph illustrating an example of a combined luminance distribution that is a luminance in a pattern image captured by an imaging portion when the laser light is scanned with the scanning speed distribution illustrated in FIG. 16.

In addition, when the position x and the combined luminance SL expressed by the above-described expression (9) are plotted in a coordinate system with the position x on the horizontal axis and the combined luminance SL on the vertical axis, the graph illustrated in FIG. 18 is obtained. In other words, FIG. 18 is a graph illustrating an example of a luminance in the pattern image captured by the imaging portion 47 when the laser light L is scanned with the scanning speed distribution illustrated in FIG. 16, that is, a distribution of the above-described combined luminance SL.

As illustrated in FIG. 18, in the combined luminance distribution expressed by the above-described expression (9), a substantially flat distribution is obtained. Therefore, the maximum amplitude $\theta_{max}$ is obtained in step S3 described above, and in this step S4, the laser light L is scanned while the mirror 451 is swung within the range of the maximum amplitude $\theta_{max}$, and thus, in step S5 which will be described later, it becomes possible to acquire a pattern image in which the influence of the peripheral light attenuation is offset or reduced. In other words, since the shape of the luminance distribution in the pattern light PL can be changed by optimizing the maximum amplitude $\theta_{max}$ of the swing of the mirror 451 corresponding to the distance h, it becomes possible to select a value that can reduce the peripheral light attenuation. In addition, since the maximum amplitude $\theta_{max}$ is also a parameter that is relatively easy to change in that the user can perform selection in any manner compared to the driving frequency f or the distance h, there is also an advantage of being useful as a control factor.

[5] Next, step S5 of acquiring the pattern image obtained by capturing the image of the projection surface P on which the pattern light PL is projected is performed. In the pattern image, as described above, the influence of the peripheral light attenuation of the condenser lens 473 is suppressed. Therefore, the decrease in S/N ratio of the pattern image is suppressed.

[6] Next, step S6 of obtaining the three-dimensional shape of the projection surface P based on the pattern image is performed. In the pattern image, since the decrease in S/N ratio due to the peripheral light attenuation is suppressed, the three-dimensional shape of the projection surface P can be measured with higher accuracy. Further, in the embodiment, it is possible to offset or reduce such peripheral light attenuation at high speed without requiring complicated calculation of the image processing or the like. Therefore, the three-dimensional shape of the object W can be measured quickly.

As described above, the three-dimensional measuring apparatus 4 according to the embodiment includes the mirror control portion 481 that controls the swing of the mirror 451, and the mirror control portion 481 controls the converted luminance distribution (second luminance distribution) of the pattern light PL in the scanning direction S in which the laser light L (line laser light) that forms a line shape is scanned along with the swing, by changing the maximum amplitude $\theta_{max}$ of the swing of the mirror 451 based on the distance information related to the distance h between the swing axis J and the projection surface P.

Accordingly, the peripheral light attenuation included in the pattern image captured by the imaging portion 47 can be offset or reduced by the converted luminance distribution based on the scanning speed distribution of the projected laser light L. As a result, by the line generating lens 442, it is possible not only to realize the offset or reduction of the peripheral light attenuation in the direction intersecting the scanning direction S, but also to offset or reduce the peripheral light attenuation in the scanning direction S by the swing of the mirror 451. Accordingly, the three-dimensional shape of the object W can be measured with high accuracy. Moreover, according to the embodiment, it is possible to offset or reduce such peripheral light attenuation at high speed without requiring time. Further, the configuration of the three-dimensional measuring apparatus 4 that realizes this is simple because it is not necessary to perform image processing or the like, and it is easy to reduce the size. Therefore, when controlling the driving of the robot 2 based on the three-dimensional information of the object W measured by the three-dimensional measuring apparatus 4, the work efficiency can be improved.

The three-dimensional measuring apparatus 4 as described above is provided in the robot system 1. In the robot system 1, the robot 2 can perform work based on the three-dimensional shape of the object W measured by the three-dimensional measuring apparatus 4. Accordingly, it is possible to efficiently perform the more accurate operation.

In other words, the robot system 1 according to the embodiment includes the robot 2 included in the robot arm 22, the three-dimensional measuring apparatus 4 that is installed in the robot arm 22 and performs the three-dimensional measurement of the object W using the laser light L, and the robot control device 5 that controls the driving of the robot 2 based on the measurement result of the three-dimensional measuring apparatus 4. In addition, the three-dimensional measuring apparatus 4 includes: the laser light source 42 that emits the laser light L; the line generating lens 442 that widens and emits the laser light L to the line-shaped light (line laser light) having the line generating lens characteristics LGL (first luminance distribution) having a higher luminance at the edge portion E than the luminance at the center portion C in the extending direction; the mirror 451 that swings around the swing axis J, reflects the line-shaped light (line laser light), and projects the pattern light PL onto the projection surface P including the object W; the imaging portion 47 that captures the image of the projection surface P on which the pattern light PL is projected and acquires the pattern image; and the measuring portion 49 that obtains the three-dimensional shape of the object W based on the pattern image.

According to the robot system 1, although it is possible to reduce the size with a simple configuration, since the three-dimensional measuring apparatus 4 with high measurement accuracy of the three-dimensional shape is provided, the robot system 1 that can be reduced in size with high design freedom and high work efficiency can be obtained.

Third Embodiment

Next, a third embodiment will be described.

Figure 19:
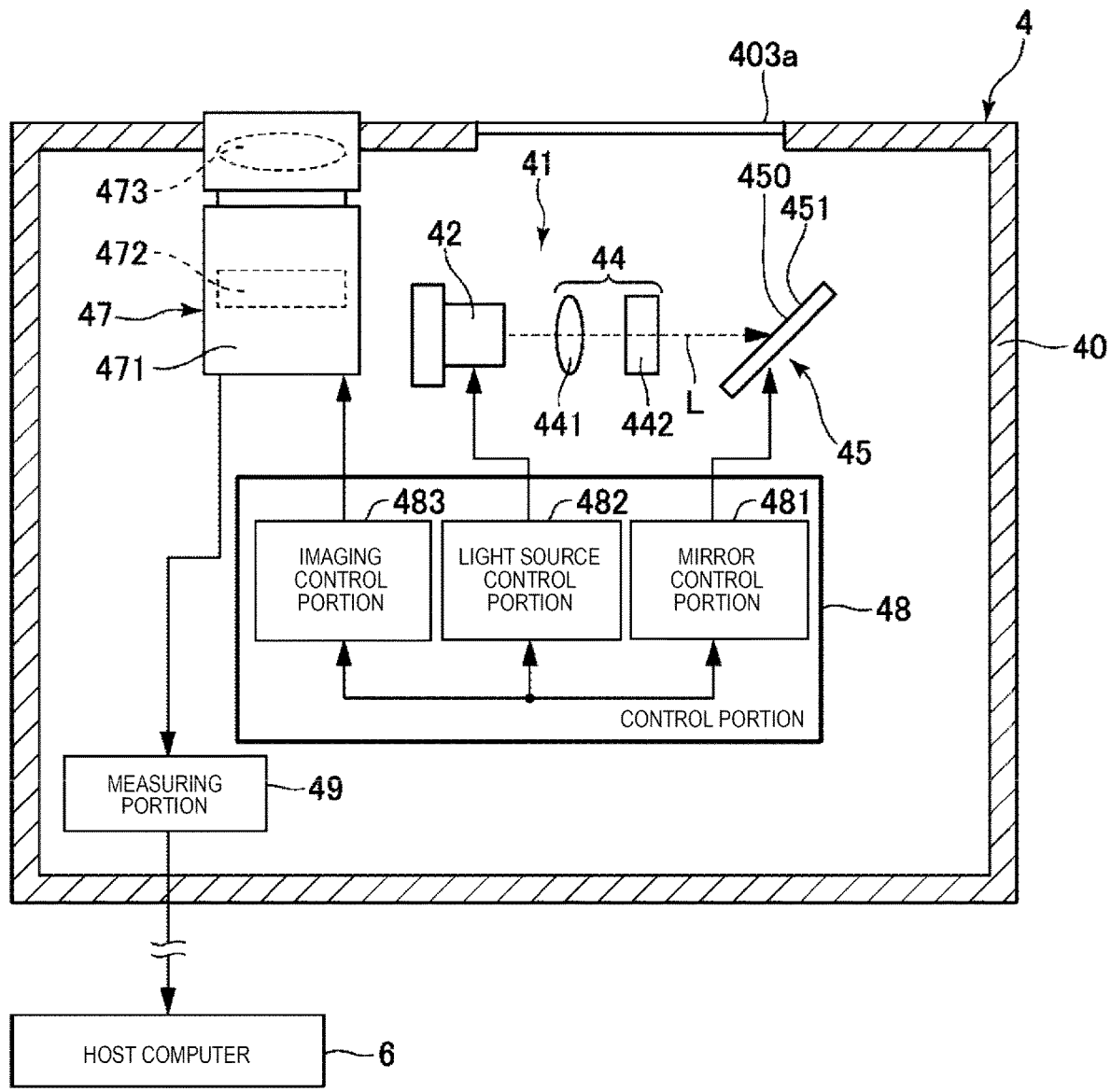
FIG. 19 is a view illustrating an overall configuration of a three-dimensional measuring apparatus according to a third embodiment.

FIG. 19 is a view illustrating an overall configuration of the three-dimensional measuring apparatus according to the third embodiment.

Hereinafter, the third embodiment will be described, but in the following description, differences from the second embodiment will be mainly described, and descriptions of the same contents will be omitted. In addition, in FIG. 19, the same configurations as those in the second embodiment will be given the same reference numerals.

The three-dimensional measuring apparatus 4 according to the third embodiment is the same as the three-dimensional measuring apparatus 4 according to the second embodiment except that the three-dimensional measuring apparatus 4 is configured to offset or reduce the peripheral light attenuation by controlling the output of the laser light source 42.

In other words, the three-dimensional measuring apparatus 4 according to the embodiment includes the light source control portion 482 that controls the output of the laser light source 42, and the light source control portion 482 is the converted luminance distribution (second luminance distribution) of the pattern light PL in the scanning direction S in which the light (line laser light) that forms a line shape is scanned along with the swing, by changing the output of the laser light L in synchronization with the swing of the mirror 451.

Accordingly, the peripheral light attenuation included in the pattern image captured by the imaging portion 47 can be offset or reduced by the converted luminance distribution based on the output change in the projected laser light L. As a result, by the line generating lens 442, it is possible not only to realize the offset or reduction of the peripheral light attenuation in the direction intersecting the scanning direction S, but also to offset or reduce the peripheral light attenuation in the scanning direction S by the swing of the mirror 451.

In addition, the light source control portion 482 appropriately changes the output of the laser light source 42 such that the luminance distribution as illustrated in FIG. 17 is realized in synchronization with the swing of the mirror 451. Accordingly, the effects the same as those of the second embodiment can be acquired. Furthermore, the light source control portion 482 may control the converted luminance distribution (second luminance distribution) of the pattern light PL in the scanning direction S in which the laser light L is scanned along with the swing as the mirror control portion 481 changes the output of the laser light L by interlocking with the change of the maximum amplitude $\theta_{max}$ of the swing of the mirror 451 based on the distance h between the swing axis J and the projection surface P. Accordingly, it is possible to realize the offset or reduction of the peripheral light attenuation in the scanning direction S while suppressing the fluctuation range of the output of the laser light source 42 to be low.

Fourth Embodiment

Next, a fourth embodiment will be described.

Figure 20:
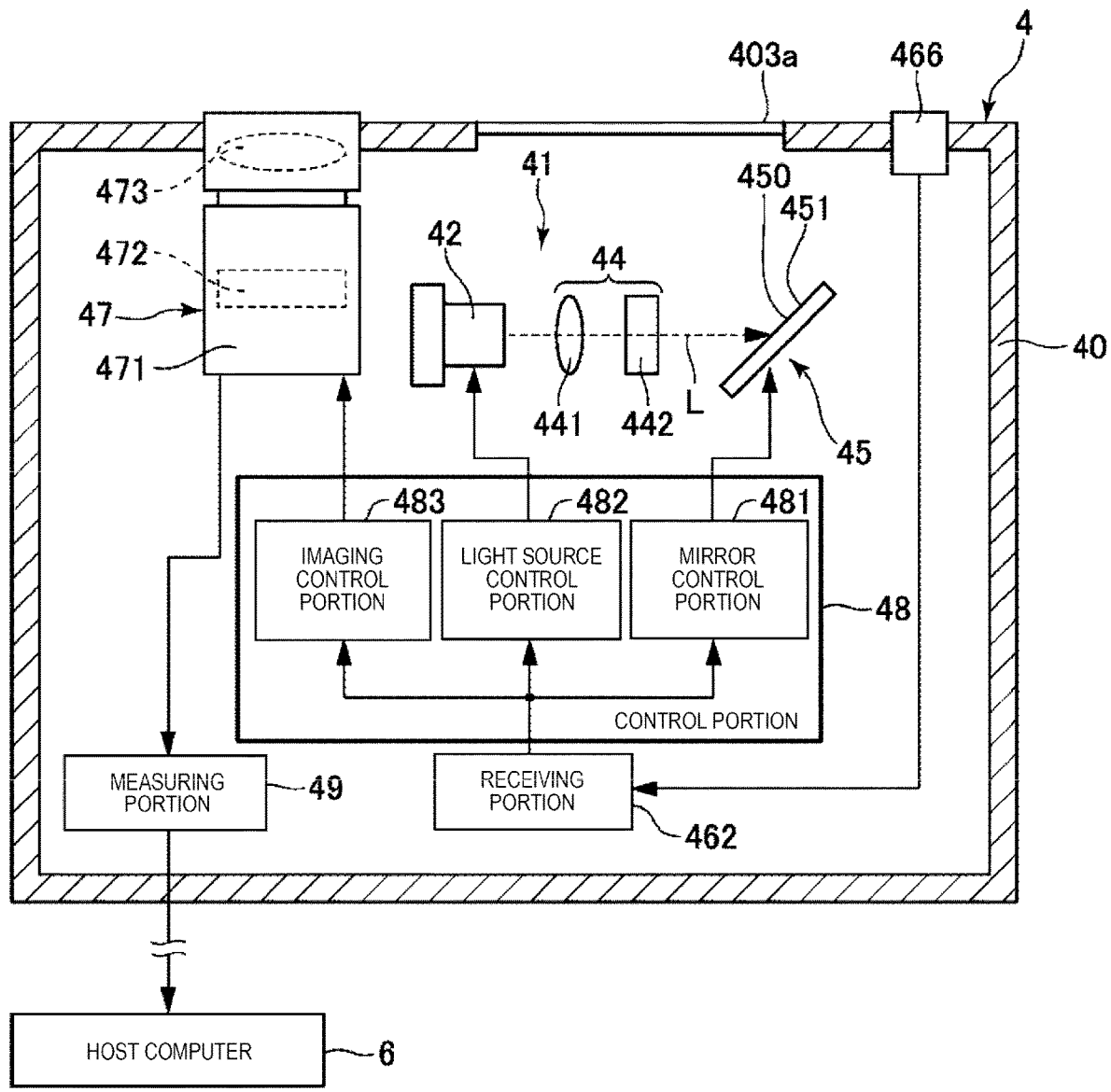
FIG. 20 is a view illustrating an overall configuration of a three-dimensional measuring apparatus according to a fourth embodiment.

FIG. 20 is a view illustrating an overall configuration of the three-dimensional measuring apparatus according to the fourth embodiment.

Hereinafter, the fourth embodiment will be described, but in the following description, differences from the second embodiment will be mainly described, and descriptions of the same contents will be omitted.

The three-dimensional measuring apparatus 4 according to the fourth embodiment is the same as the three-dimensional measuring apparatus 4 according to the second embodiment except that a distance detection portion 466 is provided instead of the input portion 464.

Specifically, the three-dimensional measuring apparatus 4 illustrated in FIG. 20 includes the distance detection portion 466 that detects the distance h between the swing axis J and the projection surface P. Then, the above-described receiving portion 462 receives the distance h detected by the distance detection portion 466 and inputs the distance h to the control portion 48. In this manner, the three-dimensional measuring apparatus 4 can acquire the distance h without an input of the user. Therefore, highly accurate three-dimensional measurement can be performed more easily.

The distance detection portion 466 is not particularly limited as long as the distance detection portion is a sensor that can detect the distance h between the swing axis J and the projection surface P, and for example, a laser distance sensor, an infrared distance sensor, an ultrasonic distance sensor, and the like can be employed.

Modification Example

Here, a modification example of the fourth embodiment will be described. The modification example is the same as the fourth embodiment except for the following differences.

Figure 21:
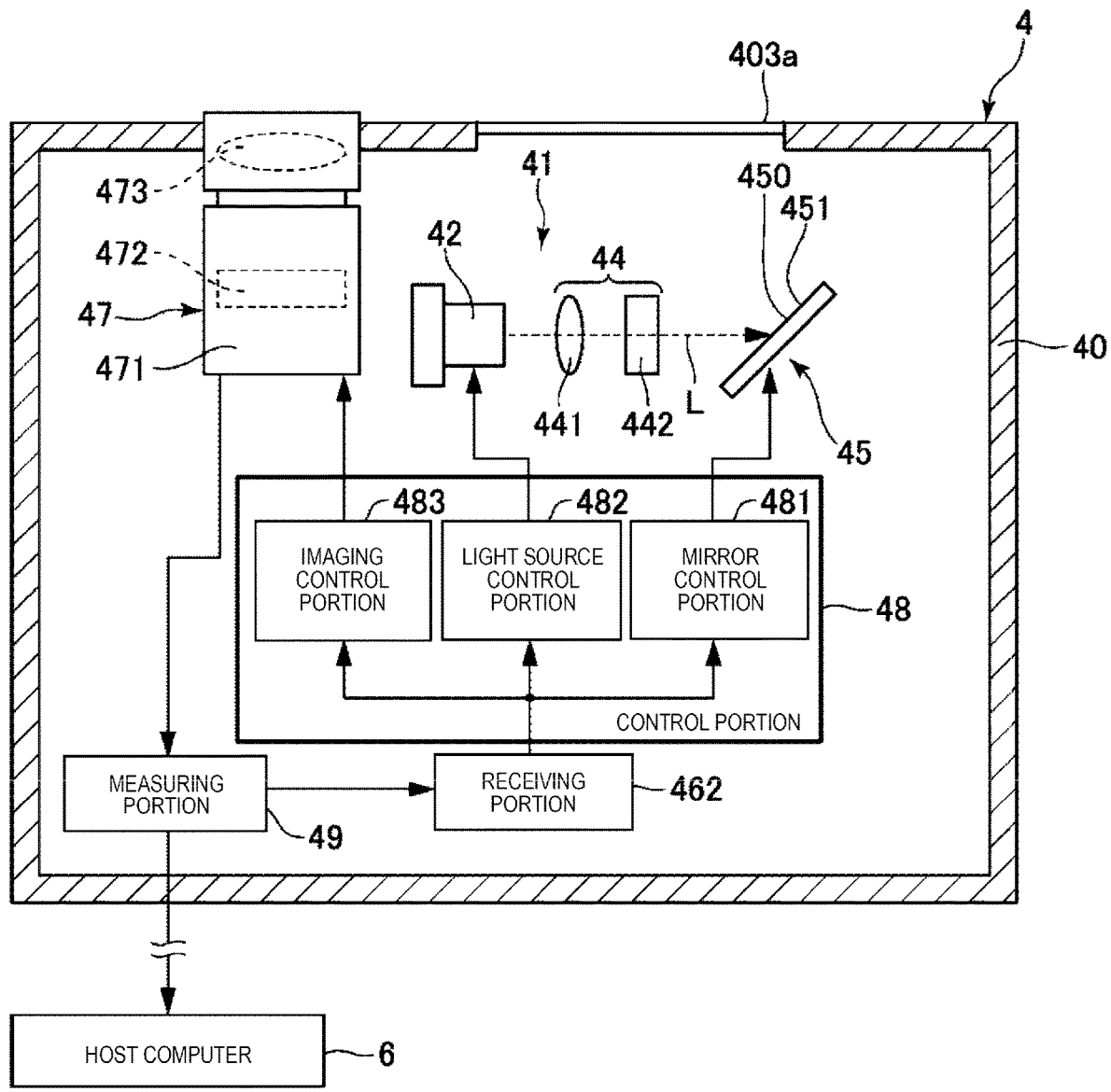
FIG. 21 is a view illustrating an overall configuration of a three-dimensional measuring apparatus according to a modification example of the fourth embodiment.

FIG. 21 is a view illustrating an overall configuration of the three-dimensional measuring apparatus according to the modification example of the fourth embodiment.

In the modification example, as illustrated in FIG. 21, the measuring portion 49 and the receiving portion 462 are coupled to each other. In addition, the measuring portion 49 calculates the distance h based on the image captured by the imaging portion 47. Specifically, the captured image acquired by the imaging portion 47 is input to the measuring portion 49. In addition, in the measuring portion 49, the three-dimensional measurement of the projection surface P including the object W is performed based on the captured image. Accordingly, since the distance to the projection surface P can be obtained, the distance h between the swing axis J and the projection surface P can be calculated based on design data stored in advance. The distance h calculated in this manner is output to the receiving portion 462.

According to such a configuration, the three-dimensional measuring apparatus 4 can acquire the distance h without an input of the user or without providing the distance detection portion 466.

Figure 22:
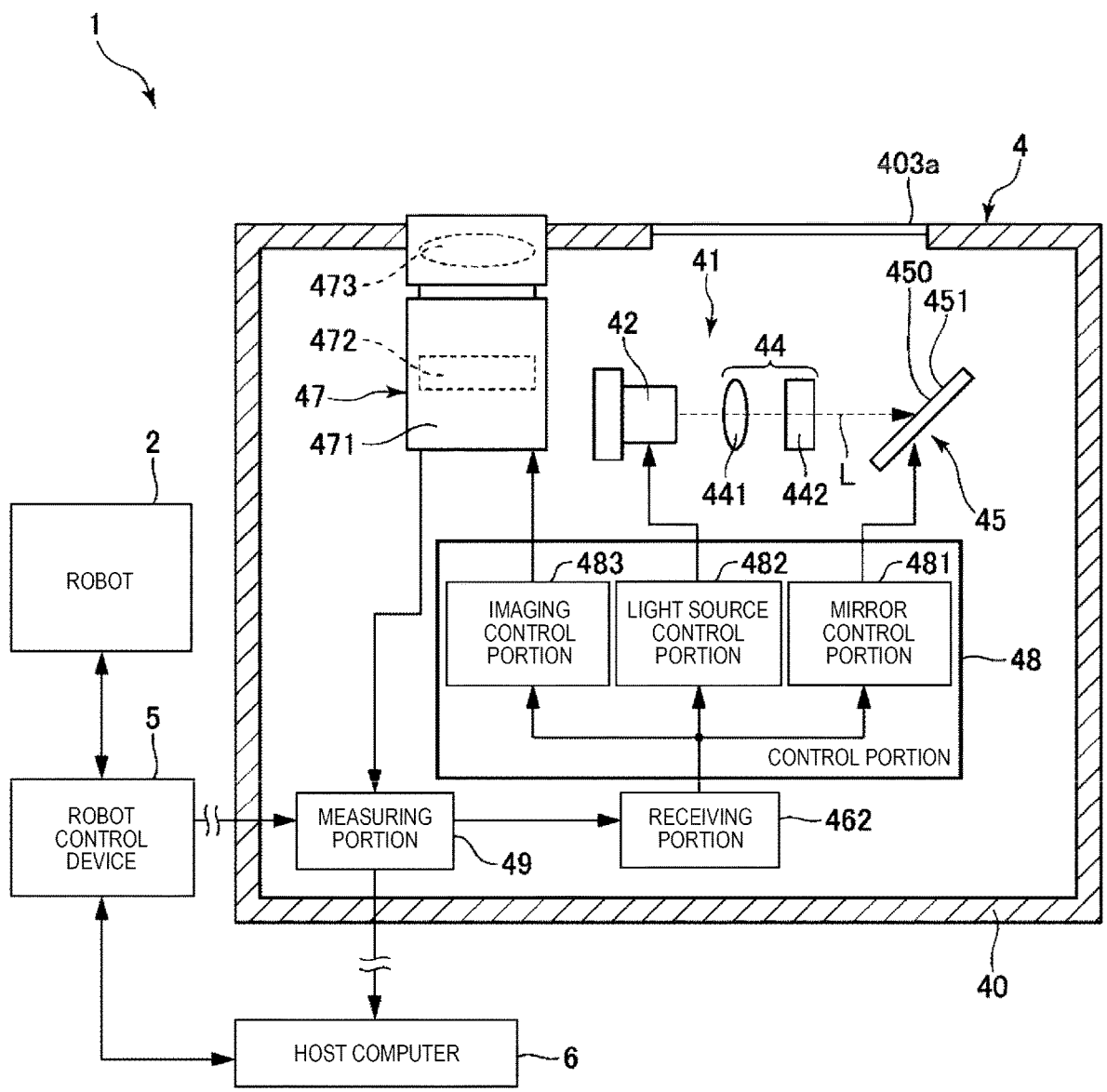
FIG. 22 is a view illustrating an overall configuration of a robot system according to another modification example of the fourth embodiment.

FIG. 22 is a view illustrating an overall configuration of the robot system according to another modification example of the fourth embodiment.

In the modification example, as illustrated in FIG. 22, the distance detection portion 466 is omitted, and instead, the receiving portion 462 and the robot control device 5 are coupled to each other. In addition, the robot control device 5 obtains the distance h between the swing axis J of the mirror 451 and the projection surface P based on the position information of the robot 2 and inputs the distance h to the three-dimensional measuring apparatus 4. The position information of the robot 2 is information obtained from each encoder from the first driving device 251 to the sixth driving device 256 provided in the robot arm 22, for example. Since each encoder acquires information on the rotation amount of the motor and the like, based on such information, in the robot control device 5, it is possible to calculate information on the position in a space of the robot arm 22. Based on such position information, it is possible to calculate the distance h between the swing axis J of the mirror 451 of the three-dimensional measuring apparatus 4 mounted on the robot arm 22 and the projection surface P in the robot control device 5.

According to such a configuration, the three-dimensional measuring apparatus 4 can acquire the distance h without an input of the user or without providing the distance detection portion 466.

In the fourth embodiment and the modification example thereof as described above, the same effects as those of the second embodiment can be obtained.

Above, the three-dimensional measuring apparatus and the robot system according to the present disclosure have been described based on the illustrated embodiments, but the present disclosure is not limited thereto, and the configurations of each part can be replaced with any configuration having similar functions. In addition, any other configurations may be added to the present disclosure. Furthermore, in the three-dimensional measuring method using the three-dimensional measuring apparatus according to the present disclosure, the above-described steps may be performed sequentially, or some steps may be performed simultaneously.

What is claimed is:

1. A three-dimensional measuring apparatus that performs three-dimensional measurement of an object using laser light, the apparatus comprising:
   a laser light source that emits the laser light;
   a line generating lens that widens and emits the laser light into line laser light having a first luminance distribution having a higher luminance at an edge portion than a luminance at a center portion in an extending direction;
   a mirror that swings around a swing axis, reflects the line laser light, and projects pattern light onto a projection surface including the object;
   an imaging portion that captures an image of the projection surface on which the pattern light is projected and acquires a pattern image; and
   a measuring portion that obtains a three-dimensional shape of the object based on the pattern image.

2. The three-dimensional measuring apparatus according to claim 1, wherein
   a transmittance of a part at which a line laser light center portion that corresponds to the center portion of the first luminance distribution of the line laser light is transmitted in the line generating lens is lower than a transmittance of a part at which a line laser light edge portion that corresponds to the edge portion of the first luminance distribution of the line laser light is transmitted.

3. The three-dimensional measuring apparatus according to claim 1, further comprising:
   a mirror control portion that controls swing of the mirror, wherein
   the mirror control portion changes a maximum amplitude of the swing of the mirror based on distance information regarding a distance between the swing axis and the projection surface, and thereby controls a second luminance distribution of the pattern light in a direction in which the line laser light is scanned.

4. The three-dimensional measuring apparatus according to claim 1, further comprising:
   a light source control portion that controls an output of the laser light source, wherein
   the light source control portion changes the output of the laser light in synchronization with the swing of the mirror, and thereby controls a second luminance distribution of the pattern light in a direction in which the line laser light is scanned.

5. A robot system including a robot having a robot arm, a three-dimensional measuring apparatus that is installed in the robot arm and performs three-dimensional measurement of an object using laser light, and a robot control device that controls driving of the robot based on a measurement result of the three-dimensional measuring apparatus, wherein
   the three-dimensional measuring apparatus includes
      a laser light source that emits the laser light,
      a line generating lens that widens and emits the laser light into line laser light having a first luminance distribution having a higher luminance at an edge portion than a luminance at a center portion in an extending direction,
      a mirror that swings around a swing axis, reflects the line laser light, and projects pattern light onto a projection surface including the object,
      an imaging portion that captures an image of the projection surface on which the pattern light is projected and acquires a pattern image, and
      a measuring portion that obtains a three-dimensional shape of the object based on the pattern image.

6. The robot system according to claim 5, wherein
   a transmittance of a part at which a line laser light center portion that corresponds to the center portion of the first luminance distribution of the line laser light is transmitted in the line generating lens is lower than a transmittance of a part at which a line laser light edge portion that corresponds to the edge portion of the first luminance distribution of the line laser light is transmitted.

7. The robot system according to claim 5, further comprising:
   a mirror control portion that controls swing of the mirror, wherein
   the mirror control portion changes a maximum amplitude of the swing of the mirror based on distance information regarding a distance between the swing axis and the projection surface, and thereby controls a second luminance distribution of the pattern light in a direction in which the line laser light is scanned.

8. The robot system according to claim 5, further comprising:
   a light source control portion that controls an output of the laser light source, wherein
   the light source control portion changes the output of the laser light in synchronization with the swing of the mirror, and thereby controls a second luminance distribution of the pattern light in a direction in which the line laser light is scanned.

* * * * *